United States Patent
Zhang et al.

(10) Patent No.: US 12,437,407 B2
(45) Date of Patent: Oct. 7, 2025

(54) METHODS AND SYSTEMS FOR ULTRASOUND IMAGE PROCESSING

(71) Applicant: WUHAN UNITED IMAGING HEALTHCARE CO., LTD., Hubei (CN)

(72) Inventors: Yaowen Zhang, Wuhan (CN); Yihui Da, Wuhan (CN)

(73) Assignee: WUHAN UNITED IMAGING HEALTHCARE CO., LTD., Wuhan (CN)

(*) Notice: Subject to any disclaimer, the term of this patent is extended or adjusted under 35 U.S.C. 154(b) by 259 days.

(21) Appl. No.: 18/299,706

(22) Filed: Apr. 12, 2023

(65) Prior Publication Data
US 2023/0316527 A1    Oct. 5, 2023

Related U.S. Application Data

(63) Continuation of application No. PCT/CN2022/127448, filed on Oct. 25, 2022.

(30) Foreign Application Priority Data

Mar. 31, 2022  (CN) .................. 202210331842.X
Apr. 14, 2022  (CN) .................. 202210389918.4

(51) Int. Cl.
*G06T 7/00* (2017.01)
*G06T 7/20* (2017.01)

(52) U.S. Cl.
CPC .............. *G06T 7/0016* (2013.01); *G06T 7/20* (2013.01); *G06T 2207/10132* (2013.01); *G06T 2207/30104* (2013.01)

(58) Field of Classification Search
CPC .............. G06T 7/0016; G06T 7/20; G06T 2207/10132; G06T 2207/30104;
(Continued)

(56) References Cited

U.S. PATENT DOCUMENTS 5,419,332 A * 5/1995 Sabbah .................. A61B 8/06
                                                         600/455
2003/0158484 A1    8/2003 Pan et al.
(Continued)

FOREIGN PATENT DOCUMENTS

CN    102048530 A    5/2011
CN    102764140 A    11/2012
(Continued)

OTHER PUBLICATIONS

First Office Action in Chinese Application No. 202210389918.4 mailed on Jul. 16, 2025, 12 pages.
(Continued)

*Primary Examiner* — Wassim Mahrouka
(74) *Attorney, Agent, or Firm* — METIS IP LLC

(57) ABSTRACT

The present disclosure provides a method for ultrasound image processing. an ultrasound image may be obtained. The ultrasound image may be associated with the blood flow velocity. An envelope curve may be determined based on ultrasound image. A plurality of first maximum points of the envelope curve may be determined. A plurality of second maximum points may be obtained by screening the plurality of first maximum points based on amplitude features of the plurality of first maximum points. A plurality of third maximum points may be obtained by correcting the plurality of second maximum points according to time features of the plurality of second maximum points. One or more parameters relating to the blood flow velocity may be determined based on the plurality of third maximum points.

20 Claims, 25 Drawing Sheets

(58) Field of Classification Search
CPC . G06T 2207/10016; A61B 8/06; A61B 8/488; A61B 8/5223
See application file for complete search history.

(56) References Cited

U.S. PATENT DOCUMENTS

| | | | |
|---|---|---|---|
| 2005/0137479 A1* | 6/2005 | Haider | A61B 8/488 600/440 |
| 2007/0016073 A1 | 1/2007 | Kim et al. | |
| 2008/0039725 A1 | 2/2008 | Man et al. | |
| 2008/0242994 A1 | 10/2008 | Tamura | |
| 2009/0062654 A1 | 3/2009 | Zhang et al. | |
| 2011/0196237 A1 | 8/2011 | Pelissier et al. | |
| 2014/0350405 A1 | 11/2014 | Vajinepalli et al. | |
| 2021/0251600 A1 | 8/2021 | Ise et al. | |

FOREIGN PATENT DOCUMENTS

| | | |
|---|---|---|
| CN | 103505246 A | 1/2014 |
| CN | 104182601 A | 12/2014 |
| CN | 106236148 A | 12/2016 |
| CN | 106580372 A | 4/2017 |
| CN | 106821420 A | 6/2017 |
| CN | 108852406 A | 11/2018 |
| CN | 109297550 A | 2/2019 |
| EP | 1798573 A2 | 6/2007 |

OTHER PUBLICATIONS

Du, Yigang et al., Errors Analysis of Pulsed Wave Doppler Ultrasound Blood Flow Quantitative Measurement and New Technology Prospect, Life Science Instruments, 17: 8-17, 2019.

\* cited by examiner

1200

┌─────────────────────────────────────────────┐
│ Sorting pixel points in the initial image to form a pixel │  1210
│ value-pixel point count image based on the pixel values │
│ of the pixel points in the initial image │
└─────────────────────────────────────────────┘
                        ↓
┌─────────────────────────────────────────────┐
│ Connecting a point at a first location and a point at a │  1220
│ second location to form a reference line │
└─────────────────────────────────────────────┘
                        ↓
┌─────────────────────────────────────────────┐
│ Using the point on the pixel value-pixel point count │  1230
│ image farthest from the reference line as a binarization │
│ threshold point │
└─────────────────────────────────────────────┘
                        ↓
┌─────────────────────────────────────────────┐
│ Determining a binarization threshold based on the │  1240
│ binarization threshold point │
└─────────────────────────────────────────────┘

FIG. 12

METHODS AND SYSTEMS FOR ULTRASOUND IMAGE PROCESSING

CROSS-REFERENCE TO RELATED APPLICATIONS

This application is a Continuation of International Patent Application No. PCT/CN2022/127448, filed on Oct. 25, 2022, which claims the priority of Chinese Application No. 202210331842.X, filed on Mar. 31, 2022, and the priority of Chinese Application No. 202210389918.4, filed on Apr. 14, 2022, the entire contents of each of which are incorporated herein by reference.

TECHNOLOGY FIELD

The present disclosure relates to the field of medical technology, and in particular to methods and systems for ultrasound image processing.

BACKGROUND

Ultrasound diagnosis is generally used in the medical field. A spectral Doppler is a medical ultrasound mode primarily used to detect a blood flow velocity. According to a continuity of emitted pulses, the spectral Doppler may include a continuous wave Doppler mode and a pulsed wave Doppler mode. Under both continuous wave Doppler mode and pulsed wave Doppler mode, the blood flow velocity may be calculated based on the Doppler effect by detecting a frequency shift of echo signals.

A Doppler waveform may be an envelope curve of a spectral Doppler image, which may reflect a trend of a peak of the blood flow velocity over time. Medical parameters for quantifying a blood flow status may be calculated based on an envelope detection and a peak detection. Exemplary medical parameters may include a maximum peak flow rate Vs, an end-diastole flow rate Vd, a peak average velocity Vm, a time-averaged flow rate Vt, a resistance index RI, a beat index PI, and a ratio of a systole peak flow rate to the end-diastole flow rate (S/D), etc. In the peak detection, a peak of Doppler waveform may be usually determined through one time of search, which is prone to errors and omissions, thereby affecting the accuracy of the obtained parameters.

In addition, in the pulsed wave Doppler mode, a Pulse Repetition Frequency (PRF) must be greater than two times a maximum Doppler frequency shift, otherwise a direction of blood flow will be miscalculated, and aliasing may appear on a spectrogram. In the continuous wave Doppler mode, since the emitted ultrasound waves are continuous, there is no aliasing phenomenon in the spectrogram theoretically. However, the blood flow signal may be not centered in the spectrogram.

Therefore, it is desirable to provide methods and systems for ultrasound image processing to accurately determine the peak of Doppler waveform and optimize the ultrasound image.

SUMMARY

According to one embodiment of the present disclosure, a method for ultrasound image processing is provided. The method for ultrasound image processing may include: obtaining an ultrasound image, wherein the ultrasound image is associated with a blood flow velocity; determining, based on the ultrasound image, an envelope curve. Determining a plurality of first maximum points of the envelope curve; obtaining, based on amplitude features of the plurality of first maximum points, a plurality of second maximum points by screening the plurality of first maximum points; obtaining a plurality of third maximum points by correcting the plurality of second maximum points according to time features of the plurality of second maximum points; and determining, based on the plurality of third maximum points, one or more parameters relating to the blood flow velocity.

According to one of the embodiments of the present disclosure, a system for ultrasound image processing includes an image obtaining module, an envelope curve determination module, a first maximum point determination module, a second maximum point obtaining module, a third maximum point obtaining module, and a parameter determination module. The image obtaining module may be configured to obtain an ultrasound image, wherein the ultrasound image is associated with a blood flow velocity. The envelope curve determination module may be configured to determine, based on the ultrasound image, an envelope curve. The first maximum point determination module may be configured to determine a plurality of first maximum points of the envelope curve. The second maximum point obtaining module may be configured to obtain, based on amplitude features of the plurality of first maximum points, a plurality of second maximum points by screening the plurality of first maximum points. The third maximum point obtaining module may be configured to obtain a plurality of third maximum points by correcting the plurality of second maximum points according to time features of the plurality of second maximum points. The parameter determination module may be configured to determine, based on the third maximum points, one or more parameters relating to the blood flow velocity.

According to one embodiment of the present disclosure, a device for ultrasound image processing may be provided. The device may include a processor configured to implement the method for ultrasound image processing.

According to one embodiment of the present disclosure, a non-transitory computer-readable storage medium on which a computer program is stored, wherein when the computer program is executed by a processor, the method for ultrasound image processing may be implemented by the computer.

The methods and systems for ultrasound image processing described in the embodiments of the present disclosure gradually may improve the accuracy of peaks of ultrasound image (e.g., a spectral Doppler blood flow image) by searching peaks multiple times based on different types of features, while being able to remove error peak values and supplement missed peaks, and the peak detection process may be more stable, accurate and comprehensive, thereby greatly improving comprehensiveness, confidence and accuracy of the peaks, such that a highly accurate human parameters relating to blood flow velocity may be obtained thereon.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein:

FIG. 12 is a flowchart illustrating an exemplary binarization processing according to some other embodiments of the present disclosure;

DETAILED DESCRIPTION

Figure 1:
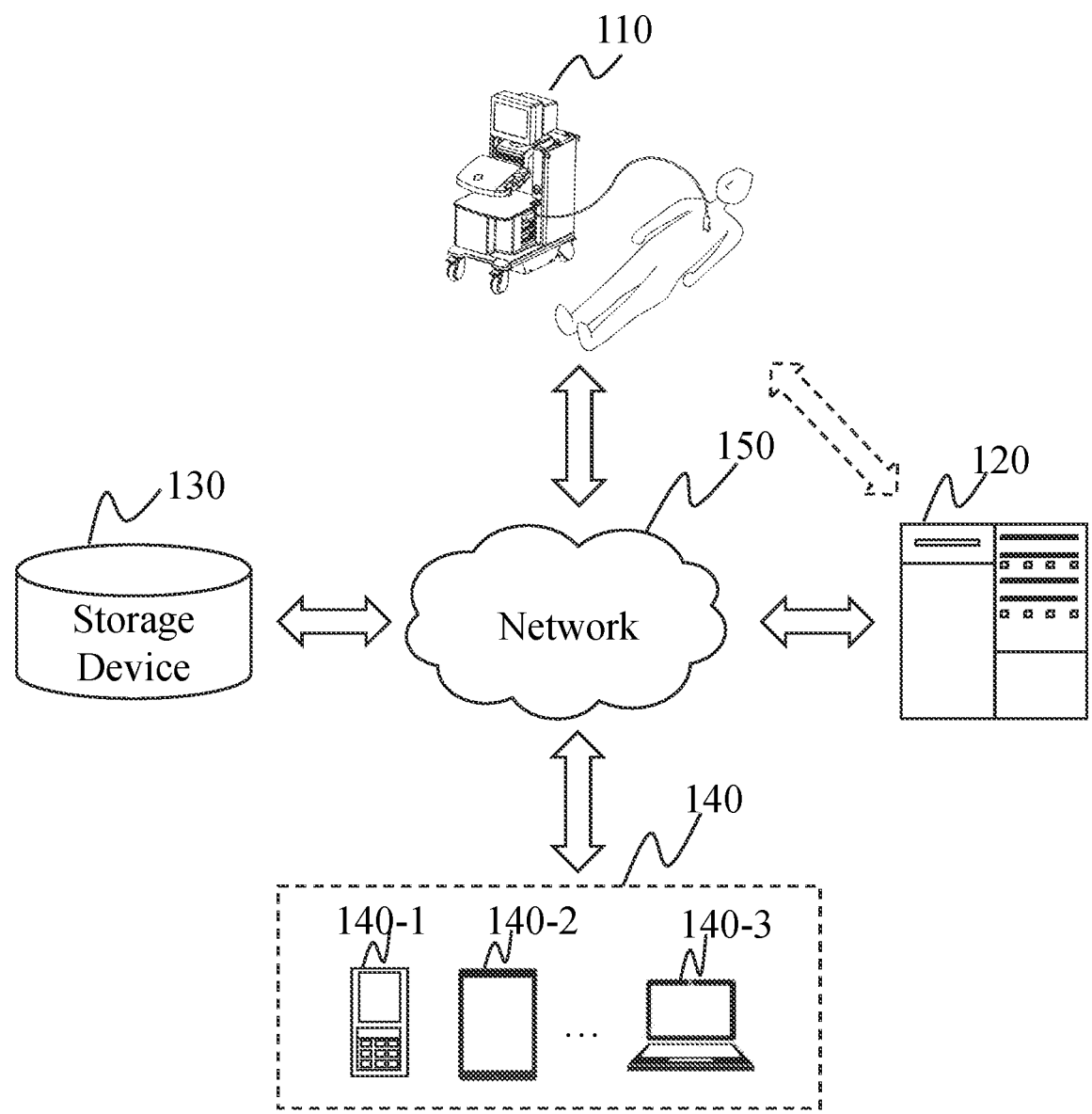
FIG. 1 is a schematic diagram illustrating an application scenario of a system for ultrasound image processing according to some embodiments of the present disclosure.

To more clearly illustrate the technical solutions of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art can apply the present disclosure to other similar situations according to the drawings without any creative effort. Unless obviously obtained from the context or the context illustrates otherwise, the same numeral in the drawings indicates the same structure or operation.

It will be understood that the terms "system," "device," "unit," and/or "module" used herein are used to distinguish different components, elements, parts, sections, or assemblies of different levels. However, the terms may be displaced by other expressions if they may achieve the same purpose.

As used in the present disclosure and the appended claims, the singular forms "a," "an," and "the" are intended to include plural referents, unless the content clearly dictates otherwise. Generally, the terms "comprise" and "include" only imply that the clearly identified steps and elements are included, but these steps and elements may not constitute an exclusive list, and the method or device may further include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

In some application scenarios, a system for ultrasound image processing may include a processing device, a medical imaging device, and the system for ultrasound image processing may achieve a peak detection of ultrasound image (e.g., spectral Doppler images) by implementing a method and/or processes disclosed in the present disclosure through the processing device, etc., thereby avoiding errors and omissions in the peak detection, achieving an accurate and comprehensive measurement of peak, and obtaining accurate medical parameters.

FIG. 1 is a schematic diagram illustrating an application scenario of a system for ultrasound image processing according to some embodiments of the present disclosure.

As shown in FIG. 1, in some embodiments, a system 100 may include a medical imaging device 110, a processing device 120, a storage device 130, a terminal 140, and a network 150.

The medical imaging device 110 refers to a medical device that uses different media to reproduce a structure inside the human body as an image. In some embodiments, the medical imaging device 110 may be a medical imaging device based on an ultrasound mode, for example, a Doppler ultrasound diagnosis device, an ultrasound diagnosis instrument, an ultrasound Doppler flow analyzer, etc. The above medical imaging device 110 is merely provided for the purposes of illustration and is not a limitation on the scope. The medical imaging device 110 may obtain a medical image associated with a blood flow velocity based on a Doppler effect. In some embodiments, the medical imaging device 110 may obtain the medical ultrasound image of a patient, e.g., a spectral Doppler blood flow image, etc., and send the medical ultrasound image of a patient to the processing device 120. In some embodiments, the medical imaging device 110 may exchange data and/or information with other components of the system 100 (e.g., the processing device 120, the storage device 130, the terminal 140) through the network 150. In some embodiments, the medical imaging device 110 may be directly connected to other components of the system 100. In some embodiments, one or more components (e.g., the processing device 120, the storage device 130, the terminal 140) of the system 100 may be included in the medical imaging device 110.

The processing device 120 may process the data and/or information obtained from other devices or system components, and execute the method for ultrasound image processing described in some embodiments based on these data, information and/or processing results to complete one or more functions described in some embodiments of the present disclosure. For example, the processing device 120 may perform the peak detection based on an obtained medical ultrasound image (e.g., a spectral Doppler blood flow image, etc.) based on the medical imaging device 110 to obtain information such as a peak map, such that various medical parameters may be obtained, for example, a heart rate HR, a maximum peak flow rate Vs, an end-diastole flow rate Vd, a peak average velocity Vm, a time-averaged flow rate Vt, a resistance index RI, a beat index PI, a ratio of a systole peak flow rate to the end-diastole flow rate (S/D), a velocity time integral VTI, etc. In some embodiments, the processing device 120 may obtain pre-stored data and/or information from the storage device 130, e.g., the medical ultrasound image, etc., to perform the method for ultrasound image processing according to some embodiments of the present disclosure.

In some embodiments, the processing device 120 may comprise one or more sub-processing devices (e.g., a single-core processing device or a multi-core multi-chip processing device). Merely by way of example, the processing device 120 may include a central processing unit (CPU), an application specific integrated circuit (ASIC), an application specific integrated processor (ASIP), a graphics processor unit (GPU), a physical processor unit (PPU), a digital signal processor (DSP), a field programmable gate array (FPGA), an programmable logic device (PLD), a controller, a microcontroller unit, a reduced instruction set computer (RISC), a microprocessor, etc. or any combination thereof.

The storage device 130 may store the data or information generated by other devices. In some embodiments, the storage device 130 may store the data and/or information collected by the medical imaging device 110 (e.g., the medical ultrasound image, etc.). In some embodiments, the storage device 130 may store the data and/or information (e.g., the peak map, various medical parameters, etc.) processed by the processing device 120, e.g., information such as The storage device 130 may include one or more storage components, each of which may be an independent device or may be a part of other devices. The storage device 130 may be local or may be implemented through a cloud.

The terminal 140 may control an operation of the medical imaging device 110. A physician may cause the medical imaging device 110 to perform a specific operation, e.g., imaging a specific body part of a patient, by sending an operational instruction to the medical imaging device 110 through the terminal 140. In some embodiments, the terminal 140 may cause the processing device 120 to execute a parameter measurement as shown in some embodiments of the present disclosure, through the instruction, etc. In some embodiments, the terminal 140 may receive the obtained information from the processing device 120 during and/or after the process, for example, an obtained peak map obtained from processing the ultrasound image, various medical parameters (e.g., the time-averaged flow rate image, etc.), etc., so that the physician can accurately determine a physical condition of the patient. In some embodiments, the terminal 140 may be a mobile device 140-1, a tablet computer 140-2, a lap-top computer 140-3, a desktop computer, and other devices having input and/or output functions, or the like, or any combination thereof.

The network 150 may connect the components of the system and/or connect the system to external resource components. The network 150 enables communication between the components and other components outside the system, facilitating an exchange of data and/or information. In some embodiments, one or more components of the system 100 (e.g., the medical imaging device 110, the processing device 120, the storage device 130, the terminal 140) may send the data and/or information to other components through the network 150. In some embodiments, the network 150 may be any one or more of a wired network or a wireless network.

It should be noted that the above descriptions are merely provided for the purposes of illustration, and not intended to limit the scope of the present disclosure. For those skilled in the art, various amendments and variations may be made under the teachings of the contents of the present disclosure. The features, structures, methods, and other features of the exemplary embodiments described in the present disclosure may be combined in various ways to obtain additional and/or alternative exemplary embodiments. For example, the processing device 120 may be based on a cloud computing platform, such as a public cloud, a private cloud, a community cloud, and a hybrid cloud. However, these amendments and variations do not depart from the scope of the present disclosure.

Figure 2:
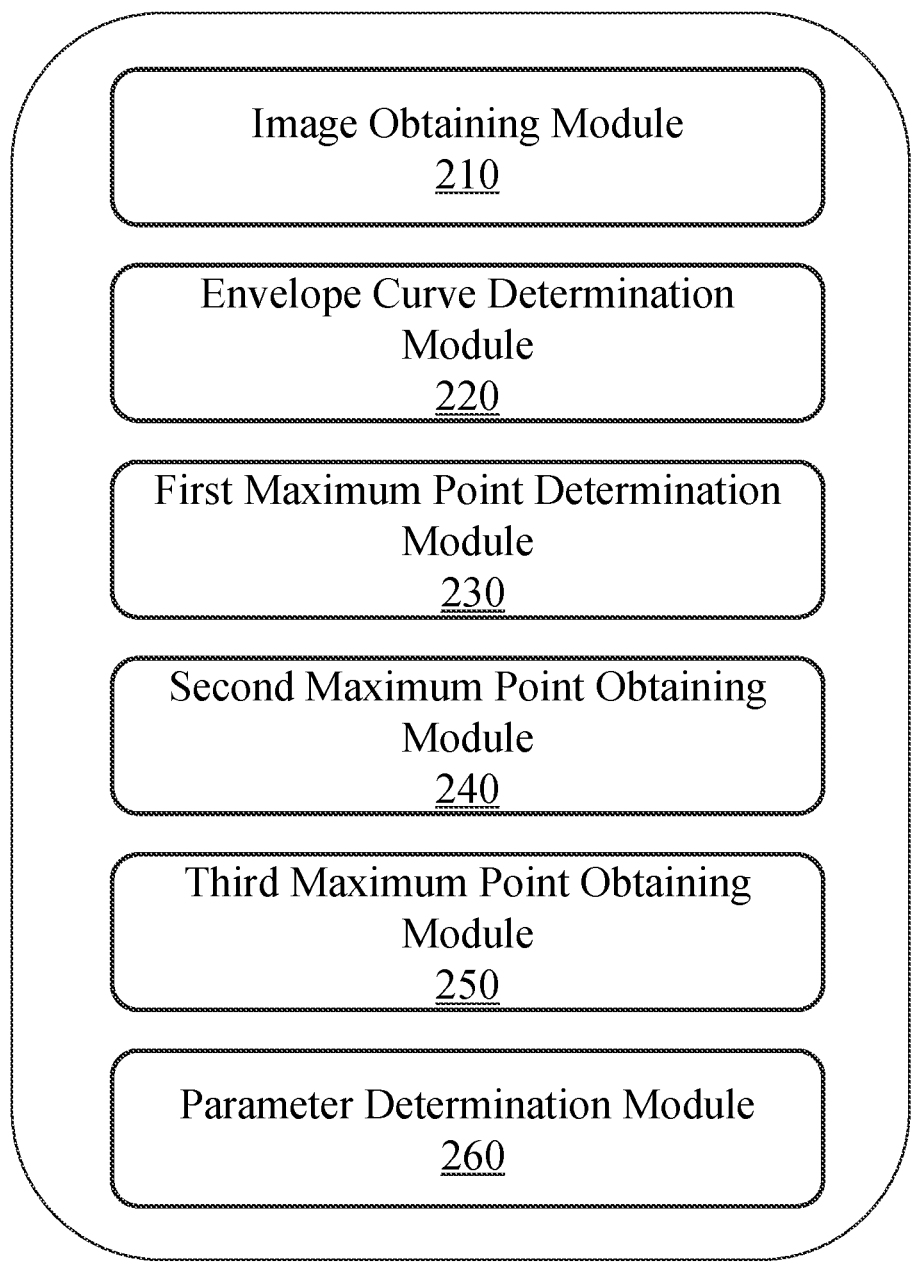
FIG. 2 is a block diagram illustrating an exemplary system for ultrasound image processing according to some embodiments of the present disclosure.

FIG. 2 is a block diagram illustrating an exemplary system for ultrasound image processing according to some embodiments of the present disclosure.

As shown in FIG. 2, in some embodiments, the system for ultrasound image processing 200 may include an image obtaining module 210, an envelope curve determination module 220, a first maximum point determination module 230, a second maximum point obtaining module 240, a third maximum point obtaining module 250, and a parameter determination module 260.

In some embodiments, the image obtaining module 210 may be configured to obtain an ultrasound image, wherein the ultrasound image may be associated with a blood flow velocity, e.g., a spectral Doppler blood flow image, etc.

In some embodiments, the envelope curve determination module 220 may be configured to determine an envelope curve (e.g., a spectral Doppler envelope curve) based on the ultrasound image.

In some embodiments, the envelope curve determination module 220 may obtain an envelope curve by processing the ultrasound image using various algorithms (e.g., an adaptive thresholding algorithm, etc.).

In some embodiments, the first maximum point determination module 230 may be configured to determine a plurality of first maximum points of the envelope curve.

In some embodiments, the first maximum point determination module 230 may be configured to obtain one or more maximum points on the envelope curve as the plurality of first maximum points based on preset time intervals.

In some embodiments, the second maximum point obtaining module 240 may be configured to obtain a plurality of second maximum points by screening the plurality of first maximum points based on amplitude features of the plurality of first maximum points.

In some embodiments, the second maximum point obtaining module 240 may determine an amplitude threshold based on the amplitude features of the plurality of first maximum points, and obtain the plurality of second maximum points by screening the plurality of first maximum points based on the amplitude threshold.

In some embodiments, the second maximum point obtaining module 240 may sort the plurality of first maximum points according to amplitudes, determine a point with a maximum slope change among the plurality of sorted first maximum points as an inflection point, and determine the amplitude threshold based on the inflection point.

In some embodiments, the determination of the amplitude threshold based on the inflection point may include determining a first average amplitude of a first portion of maximum points preceding the inflection point among the plurality of sorted first maximum points, determining a second average amplitude of a second portion of maximum points following the inflection point among the plurality of sorted first maximum points, and determining the amplitude threshold based on the first average amplitude and the second average amplitude. In some embodiments, the second maximum point obtaining module 240 may classify the plurality of first maximum points to obtain a first group and a second group satisfying a classification condition, and determine the amplitude threshold based on numerical features of the first group and the second group. The classification condition may include an intra-group distribution condition of the first group and the second group, and a difference condition between the first group and the second group.

In some embodiments, the third maximum point obtaining module 250 may be configured to obtain a plurality of third maximum points by correcting the plurality of second maximum points according to time features of the plurality of second maximum points.

In some embodiments, the third maximum point obtaining module 250 may obtain a first time interval between each two adjacent second maximum points of the plurality of second maximum points and a first average time of the first time intervals. For the each two adjacent second maximum points, in response to determining that the first time interval is larger than a first time threshold, the two adjacent second maximum points and one or more maximum points between the two adjacent second maximum points may be designated as third maximum points. In response to determining that the first time interval is smaller than a second time threshold, a second maximum point whose time is closest to the first average time in the two adjacent second maximum points may be designated as a third maximum point, and another second maximum point in the two adjacent second maximum points may be deleted, wherein the first time threshold is larger than the second time threshold.

In some embodiments, the parameter determination module 260 may be configured to determine one or more parameters relating to the blood flow velocity based on the plurality of third maximum points.

In some embodiments, the parameter determination module 260 may determine a location of end-diastole based on the plurality of third maximum points.

In some embodiments, the parameter determination module 260 may determine at least one parameter associated with the blood flow velocity of a heart rate, a maximum peak flow rate, an end-diastole flow rate, a peak average velocity, a time-averaged flow rate, a resistance index, a beat index, a ratio of a systole peak flow rate to the end-diastole flow rate, or a velocity time integral based on the ultrasound image, the plurality of third maximum points, and/or the location of the end-diastole.

Figure 3:
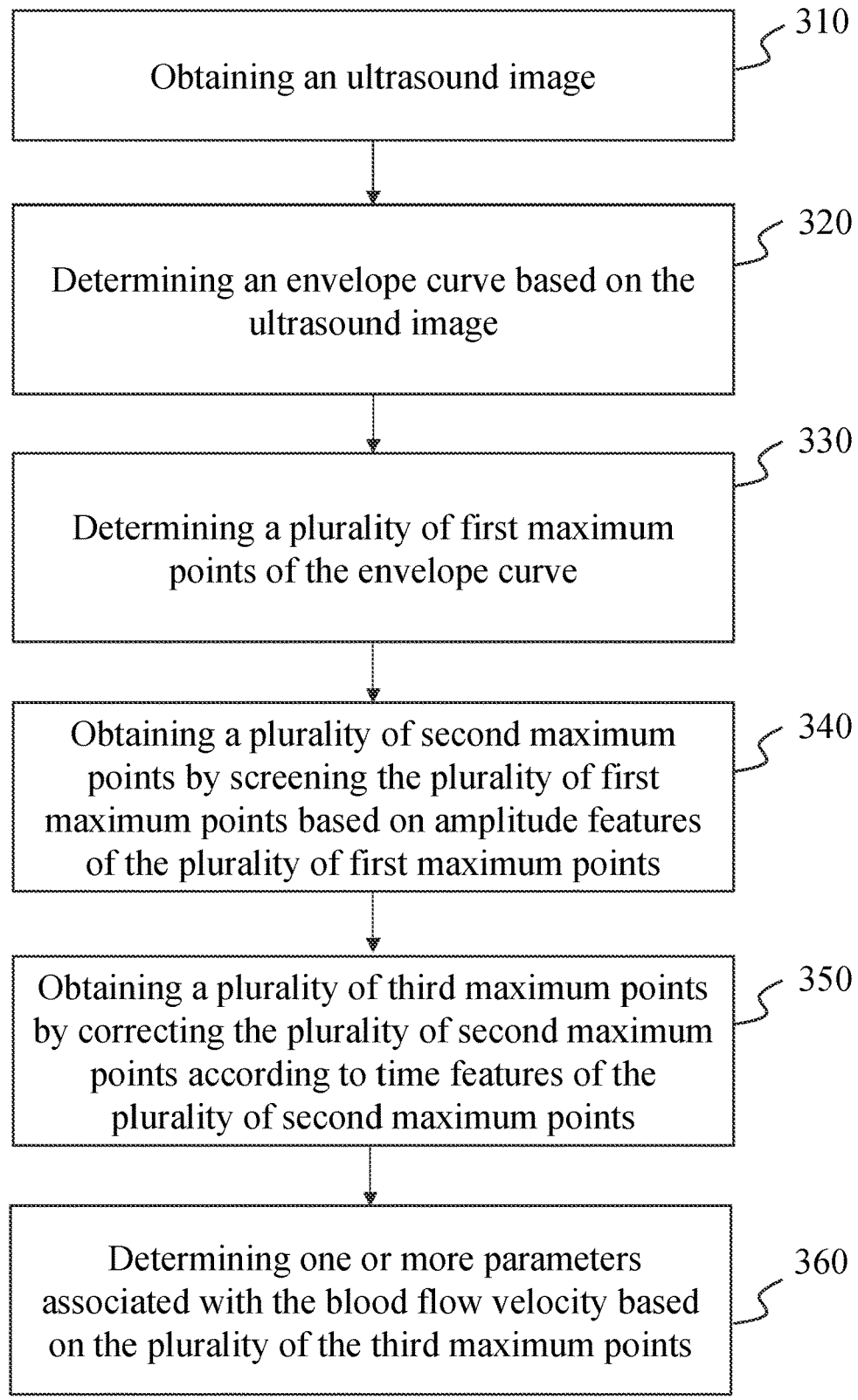
FIG. 3 is a flowchart illustrating an exemplary process for ultrasound image processing according to some embodiments of the present disclosure.

More descriptions regarding the image obtaining module 210, the envelope curve determination module 220, the first maximum point determination module 230, the second maximum point obtaining module 240, the third maximum point obtaining module 250, and the parameter determination module 260 may be found in FIG. 3 and its description.

FIG. 3 is a flowchart illustrating an exemplary process for ultrasound image processing according to some embodiments of the present disclosure.

As shown in FIG. 3, the process 300 may include one or more of the steps described below. In some embodiments, the process 300 may be performed by the processing device 120.

Step 310, an ultrasound image may be obtained. In some embodiments, step 310 may be performed by the image obtaining module 210.

The ultrasound image may be a medical image obtained based on an ultrasound, for example, a spectral Doppler blood flow image, an abdominal ultrasound image, etc. The ultrasound image may be generated based on the Doppler effect (i.e., when an emitted ultrasound wave passes through the blood flow, a received ultrasound wave has a certain frequency shift, and an amount of shift is related to the blood flow velocity). An image of the blood flow velocity changing over time may be calculated based on the Doppler effect, i.e., the spectral Doppler blood flow image, wherein a Doppler waveform is an envelope curve of the image, which can reflect a trend of a peak of the blood flow velocity over time. In some embodiments, the ultrasound image may be a medical image associated with the blood flow velocity. For example, as the spectral Doppler blood flow image shown in FIG. 5, wherein a horizontal coordinate is time, the unit is second (s); a vertical coordinate is velocity, and the unit is meter/second (m/s), and a light-colored point (i.e., a point with relatively high brightness) is a point for identifying an ultrasound echo.

In some embodiments, the ultrasound image may be obtained through a plurality of ways. For example, the ultrasound image may be obtained through a medical imaging device based on an ultrasound mode (e.g., a Doppler ultrasound diagnosis device, an ultrasound diagnosis instrument, an ultrasound Doppler flow analyzer, etc.). As another example, the ultrasound image may be obtained from the storage device.

Step 320, an envelope curve may be determined based on the ultrasound image. In some embodiments, step 310 may be performed by the envelope curve determination module 220.

The envelope curve refers to a Doppler waveform of the ultrasound image (e.g., the spectral Doppler blood flow image, etc.), which is a curve obtained by enveloping an edge of the ultrasound image, and may be represented by an ultrasound image including the envelope curve, e.g., the spectral Doppler envelope image, etc.

Figure 5:
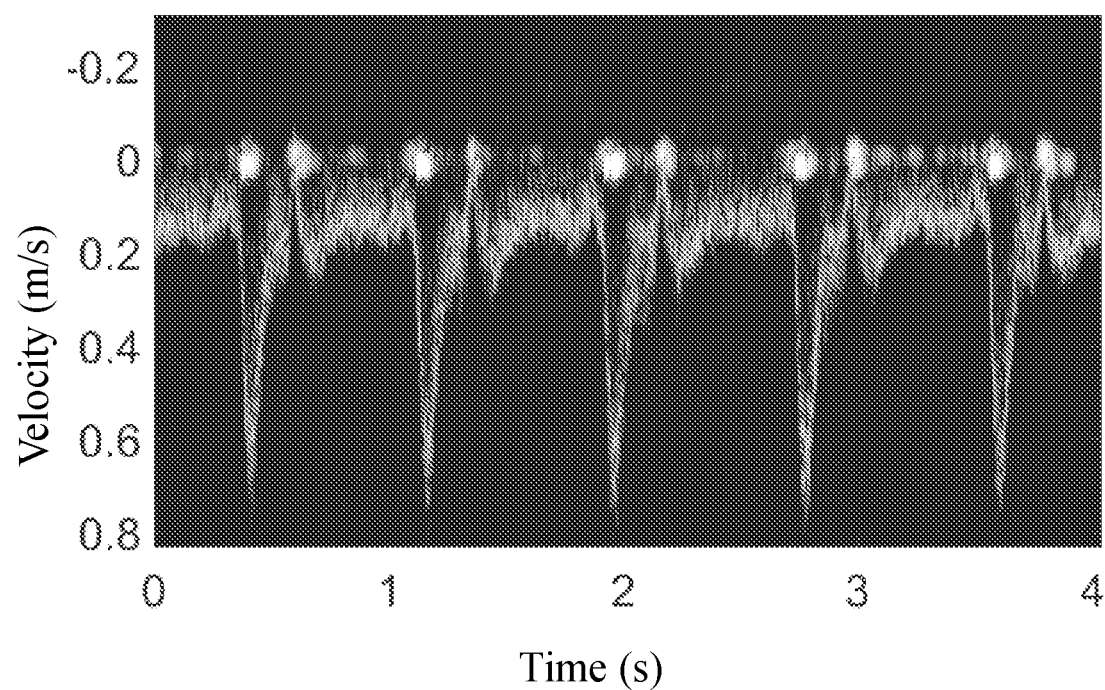
FIG. 5 is a schematic diagram illustrating a spectral Doppler blood flow image according to some embodiments of the present disclosure.
Figure 6:
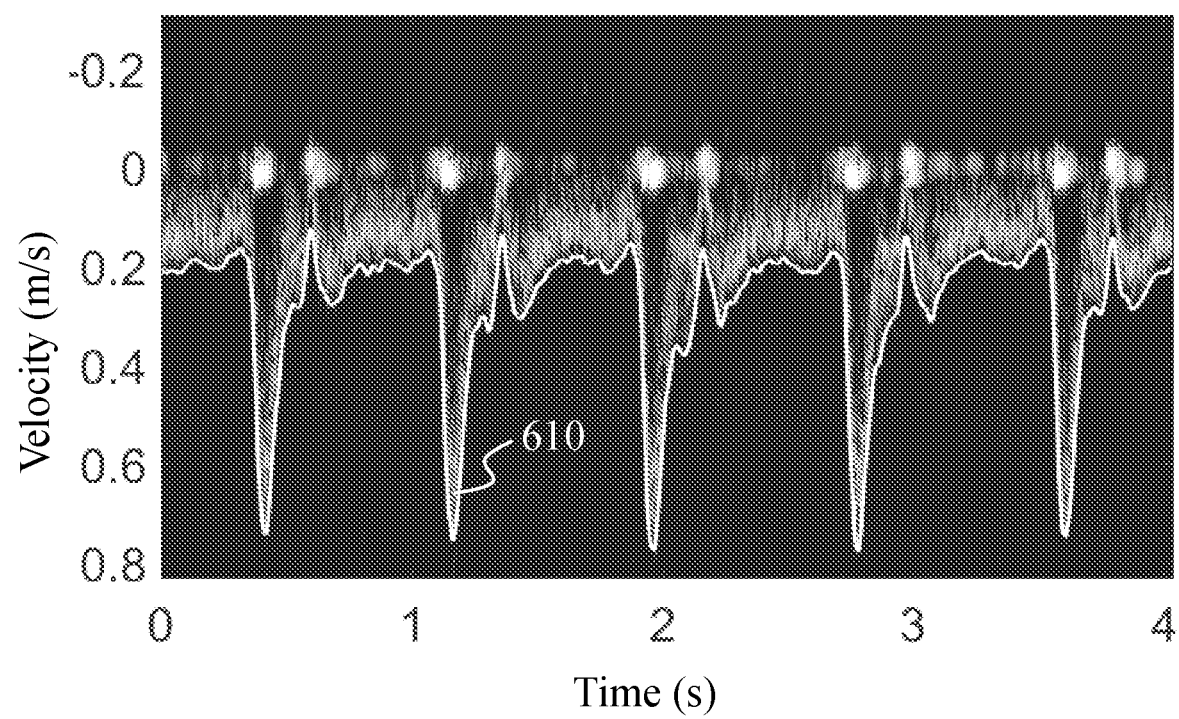
FIG. 6 is a schematic diagram illustrating a spectral Doppler envelope curve according to some other embodiments of the present disclosure.

In some embodiments, the envelope curve may be determined by processing the ultrasound image using various methods (e.g., a threshold method, a percentage method, a geometric method, etc.). For example, a spectral Doppler envelope curve as shown in FIG. 6 may be obtained by processing the spectral Doppler blood flow image as shown in FIG. 5. In FIG. 6, A light-colored solid curve 610 is the spectral Doppler envelope curve, and the remaining in FIG. 6 is the same as FIG. 5.

In some embodiments, the envelope curve may be obtained by processing the ultrasound image using an adaptive thresholding algorithm. To be able to accurately and robustly estimate an envelope of the Doppler spectrogram, it is necessary to distinguish boundaries of a Doppler spectral signal and a noise on the spectrogram. In some embodiments, by setting a threshold, data in the spectrogram that is greater than the threshold may be regarded as the Doppler spectral signal, and data that is smaller than or equal to the threshold may be regarded as the noise. The threshold may be set to a fixed percentage of a sum of all signals and noise, and which may have a relatively effect when a ratio of signal to noise (SNR) is relatively high. Since an estimation of the method to the noise is achieved by averaging spectral lines close to a cutoff frequency, the estimated peak has a positive shift at a relatively small SNR; the estimated peak has a negative shift at a relatively large SNR. In some embodiments, a maximum frequency bias may be determined by comparing a Doppler power spectrum intensity with a set threshold by using an adaptive thresholding algorithm, wherein the threshold can be adaptively adjusted based on a noise level and/or a SNR for each cardiac cycle. The algorithm assumes that the noise level and/or the SNR are relatively stable in one cardiac cycle, thus an average noise level may be determined according to the cardiac and/or the SNR.

In some embodiments, the envelope curve may be obtained by processing the ultrasound image based on a machine learning model. The machine learning model may be a variety of models suitable for image processing, e.g., a neural network model, etc. An input of the machine learning model may be the ultrasound image and the output of the machine learning model may be the envelope curve image.

Step 330, a plurality of first maximum points of the envelope curve may be determined. In some embodiments, step 330 may be performed by the first maximum point determination module 230.

As used herein, a maximum point may be referred to as a peak point within a certain time interval. A first maximum point may refer to a maximum point on the envelope curve obtained after a first processing, which is a maximum point within a certain time interval. In some embodiments, there may be multiple first maximum points. Each first maximum point may correspond to a time interval, which is the maximum point within the time interval. But the time interval may be as small as possible and typically be set to a time (about 0.27 seconds) of one heartbeat cycle at a human extreme heart rate (220 beats/min). In some embodiments, the maximum point of the envelope curve refers to a point where a value of the vertical coordinate (i.e., the blood flow velocity) is maximum and may correspond to a peak of blood flow velocity. In order to determine the peak of blood flow velocity, the plurality of maximum points on the envelope curve may be obtained.

Figure 7:
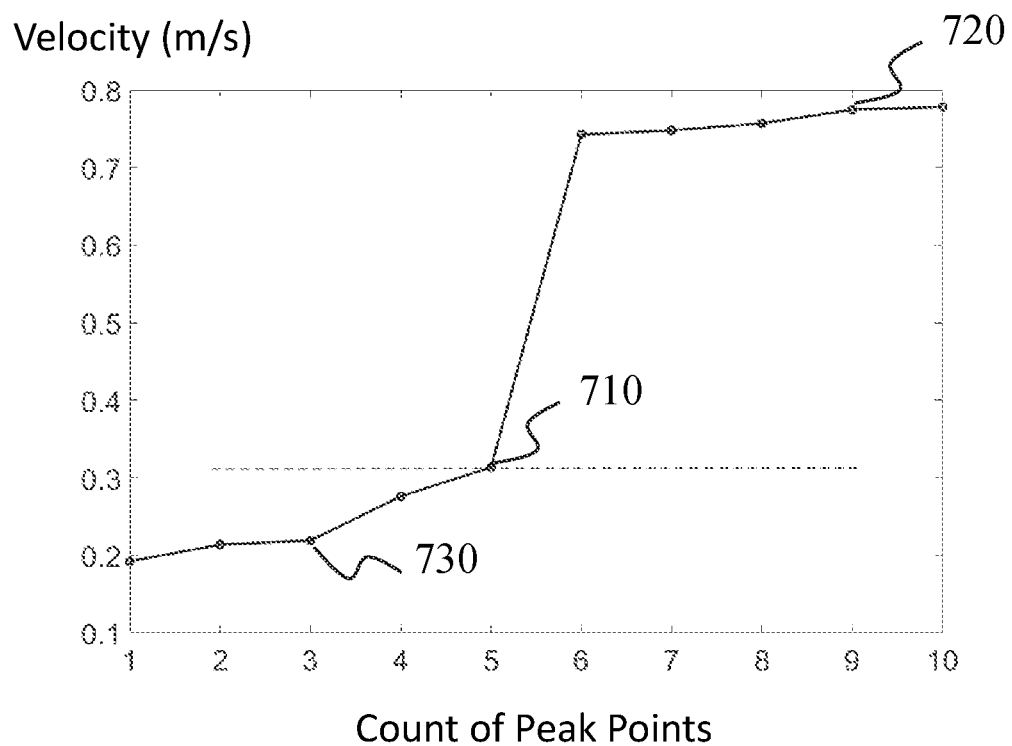
FIG. 7 is a schematic diagram illustrating searching results of first maximum points according to some embodiments of the present disclosure.

In some embodiments, the plurality of first maximum points on the envelope curve may be obtained through the plurality of ways (e.g., a preset time interval, etc.). For example, a first maximum point searching result as shown in FIG. 7 may be obtained by processing the spectral Doppler envelope curve as shown in FIG. 6 through the plurality of ways. FIG. 7 illustrates a plurality of exemplary first maximum points after sorting. In FIG. 7, a horizontal axis represents a count of first maximum points; a vertical axis represents the blood velocity in meters per second (m/s); and endpoints of each line segment represents first maximum points.

In some embodiments, one or more maximum points on the envelope curve may be obtained as the plurality of first maximum points based on preset time intervals. For example, a minimum time interval (noted as Th1) may be set to search the maximum points at every Th1 time interval. In some embodiments, the preset time intervals may be set by using a human extreme heart rate as a reference, wherein a unit of the time interval may be seconds and the unit of the heart rate is correspondingly beats/minute, and the preset time intervals may be empirical values, for example, set to 60/extreme heart rate. In some embodiments, the preset time intervals may be uniform, i.e., each time interval is the same, or may be non-uniform, i.e., each time interval is different.

In some embodiments, all the maximum points on the envelope curve may be directly obtained as the first maximum points without setting a time interval. Specifically, each inflection point on the envelope curve may be obtained, and if the inflection point is maximum point (i.e., the vertical coordinate values of the adjacent points to the left and right of the inflection point are smaller than the vertical coordinate value of the inflection point), the inflection point may be obtained as a first maximum point.

Step 340, a plurality of second maximum points may be obtained by screening the plurality of first maximum points based on amplitude features of the plurality of first maximum points. In some embodiments, step 340 may be performed by the second maximum point obtaining module 240.

The maximum points of the envelope curve obtained after one processing may not have high accuracy due to various reasons such as unreasonable time intervals, and the maximum points with higher accuracy may be obtained by further screening from the maximum points obtained based on the first processing. In some embodiments, the plurality of second maximum points may be obtained by screening the plurality of first maximum points based on the amplitude features of the plurality of first maximum points. In some embodiments, there are multiple second maximum points.

In some embodiments, an amplitude threshold may be determined based on the amplitude features of the plurality of first maximum points. An amplitude of a maximum point may be a vertical coordinate value of the maximum point (e.g., a blood flow velocity value). The amplitude features of the plurality of first maximum points may be features associated with the vertical coordinate values of the first maximum points, for example, amplitude distribution features of the plurality of first maximum points, amplitude values of inflection points in the plurality of first maximum points, etc. More descriptions regarding the determination of the amplitude threshold may be found in the relevant descriptions of step 431 and step 432 of FIG. 4, which will not be repeated herein.

In some embodiments, after the amplitude threshold is obtained, the plurality of second maximum points may be obtained by screening the plurality of first maximum points based on the amplitude threshold. Specifically, the first maximum points may be screened within the amplitude threshold, and the screened first maximum points may be used as the second maximum points. More descriptions regarding the obtaining of the second maximum points based on the amplitude thresholds may be found in the relevant descriptions of step 433 of FIG. 4, which will not be repeated herein.

In some implementations of the present disclosure, after the two screenings are performed, the maximum points on the envelope curve may be first searched by the cardiac cycle interval, and the maximum points (i.e., the peaks of blood flow velocity) may be obtained by optimizing the threshold value again, which may avoid the problem of inaccurate peak detection in ultrasound image due to various reasons to obtain more accurate peak, thereby improving the accuracy of blood flow velocity detection.

Step 350, a plurality of third maximum points may be obtained by correcting the plurality of second maximum points according to time features of the plurality of second maximum points. In some embodiments, step 350 may be performed by the third maximum point obtaining module 250.

Among a plurality of obtained maximum points, there may be some error maximum points or some maximum points may be missed due to various reasons. For example, since amplitudes of some maximum points are relatively different from amplitudes of the remaining maximum points, some maximum points may be missed. Therefore, the maximum points may be corrected to remove the error maximum points and to add the missed maximum points. In some embodiments, the plurality of third maximum points may be obtained by correcting the plurality of second maximum points according to time features of the plurality of second maximum points. In some embodiments, there are multiple third maximum points.

The time features of the maximum points are features that are associated with the horizontal coordinates (i.e., time) of the maximum points. In some embodiments, the time features of the maximum points may be associated with the time intervals between the plurality of maximum points. More descriptions of how to obtain the plurality of third maximum points may be found in the relevant descriptions of steps 441 and 442 of FIG. 4, which will not be repeated herein.

In some embodiments, the maximum points may be obtained by processing the envelope curve based on a machine learning model. For example, the third maximum points may be output directly by a model, or the first maximum points and/or the second maximum points during processing may be output. The machine learning model may be various models applicable to image processing, e.g., a neural network model, etc. An input of the machine learning model may be an envelope curve image, and an output of the machine learning model may be an image corresponding to maximum points (e.g., the first maximum points, the second maximum points, or the third maximum points).

In some embodiments of the present disclosure, the obtained maximum points may be corrected based on time features. The error maximum points may be removed and the missed maximum points may be added to make the peak detection more comprehensive, thereby extremely enhancing the robustness of ultrasound image peak detection and improving stability and accuracy of blood flow velocity detection.

Step 360, one or more parameters associated with the blood flow velocity may be determined based on the plurality of the third maximum points. In some embodiments, step 360 may be performed by the parameter determination module 260.

Body parameters may be determined from the ultrasound image based on the maximum points of the obtained envelope curve. In some embodiments, the parameters relating to blood flow velocity, e.g., the heart rate, the flow rate, etc., may be determined based on the third maximum points.

In some embodiments, the third maximum points may be used as peak points of systole, which may be used as a basis for searching a location of end-diastole in each two adjacent peak points.

The end-diastole may be usually an end point of one cardiac cycle. At the end of the cardiac cycle, i.e., when entering a systole, the Doppler envelope curve would show a rapid upward trend, and the end-diastole may be searched for within a certain time range close to the peak points of systole (i.e., the maximum points) according to the feature. In some embodiments, the location of end-diastole may be determined based on the plurality of third maximum points.

In some embodiments, assuming that a peak time is t0 and a set time range is a time threshold a, a minimum point may be searched for in the time range t0−a~t0. The minimum point may be a point whose vertical coordinate is a minimum value, and the horizontal coordinate corresponding to the minimum point may be determined as the location of end-diastole. A maximum amplitude of the Doppler envelope is recorded as Max, the minimum amplitude is recorded as Min, then a height (amplitude) threshold b of end-diastole may be determined according to the following equation (1):

$$b = coe4 * \text{Max} + (1 - coe4) * \text{Min} \qquad (1).$$

where a and coe4 denote coefficients, which may be empirical values. The a may be set according to the intervals between adjacent peaks, i.e., periods, and the coe4 may be set to a value smaller than or equal to 0.5.

In some embodiments, the minimum point closest to the peak may be searched according to a time threshold a and a height threshold b described above, i.e., the minimum point closest to the height threshold b may be found in the time range t0−a~t0, and the minimum point is an end-diastole point.

Figure 8:
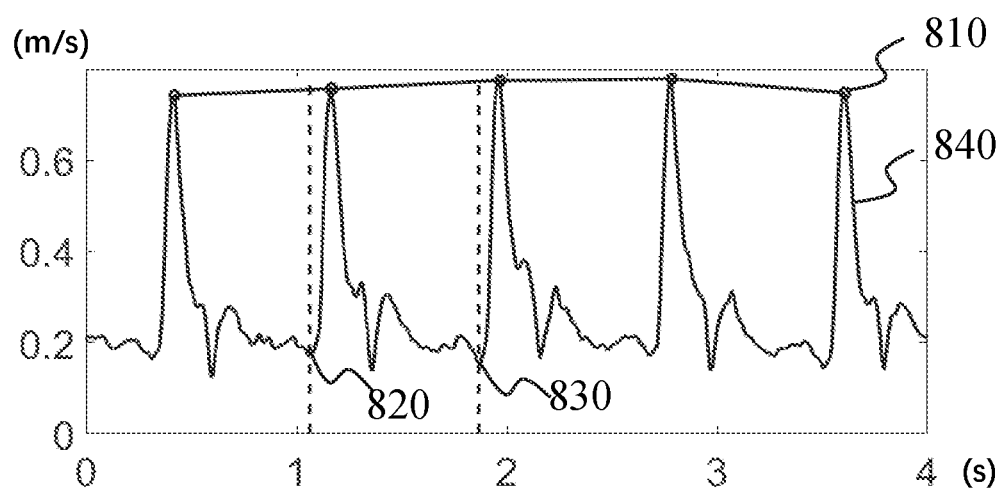
FIG. 8 is a schematic diagram illustrating searching results of a peak and an end-diastole according to some embodiments of the present disclosure.

FIG. 8 is a schematic diagram illustrating searching results of a peak and an end-diastole according to some embodiments of the present disclosure. As shown in FIG. 8, a curve 840 is an envelope curve, dots (e.g., a point 810) are peaks, i.e., the third maximum points, and intersections of a dotted line with the envelope curve are end-diastole points (i.e., a point 820 and a point 830) in a second cardiac cycle.

In some embodiments, one or more body parameters associated with the blood flow velocity may be determined based on the ultrasound image according to the locations of third maximum points and/or the end-diastole. For example, the one or more body parameters may include a heart rate HR, a maximum peak flow rate Vs, an end-diastole flow rate Vd, a peak average velocity Vm, a time-averaged flow rate Vt, a resistance index RI, a beat index PI, a ratio of a systole peak flow rate to the end-diastole flow rate (S/D), a velocity time integral VTI, etc.

In some embodiments, the vertical coordinate value of a peak point of the systole, i.e., a corresponding blood flow velocity value, may be used as a systole peak value. The vertical coordinate value of an end-diastole point, i.e., the corresponding blood flow velocity value, may be used as an end-diastole value.

Figure 9:
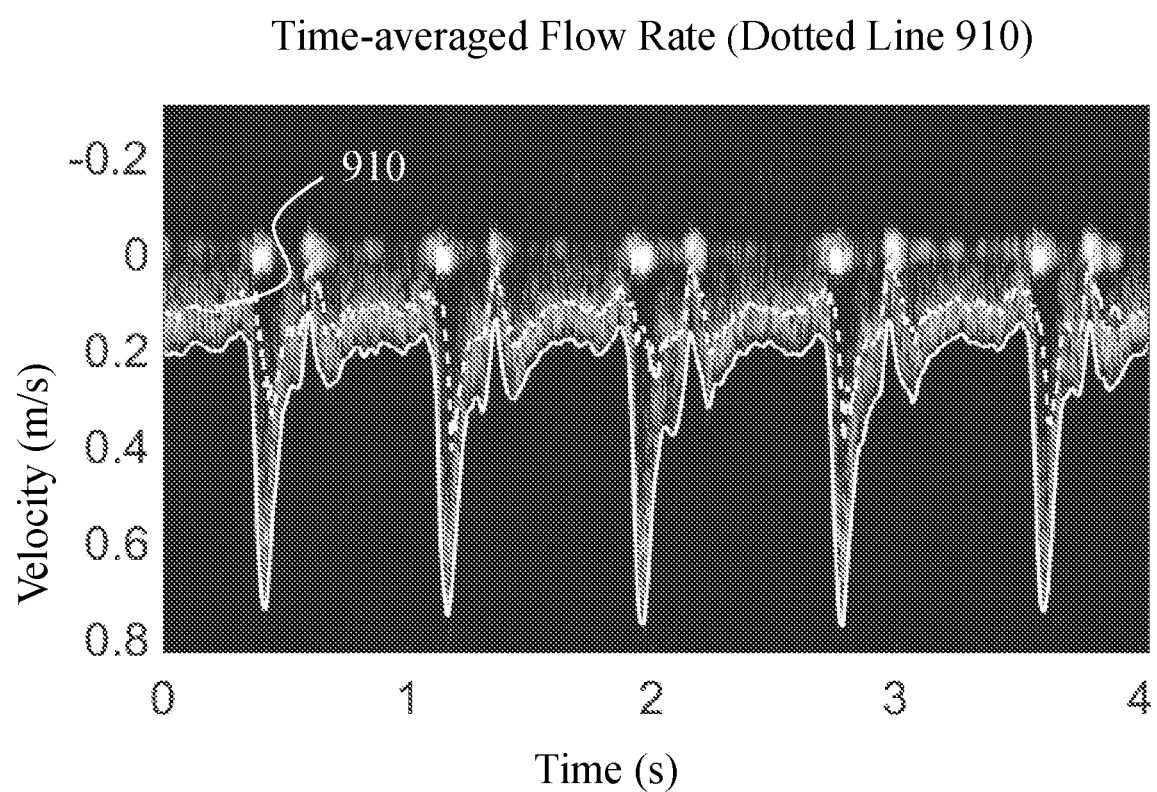
FIG. 9 is a schematic diagram illustrating a time-averaged flow rate according to some embodiments of the present disclosure.

In some embodiments, one or more parameters associated with blood flow velocity may be determined based on the peak points of the systole and/or end-diastole points. An end-diastole point may be represented by a location of end-diastole. Merely by way of example, these parameters may be determined through the following manner. The heart rate HR is equal to 60/(adjacent peak intervals). An adjacent peak interval is a difference between the horizontal coordinate values of two peak points of the systole. The maximum peak flow rates Vs equal to velocity values corresponding to the peak points of systole, i.e., the vertical coordinate values. The end-diastole flow rates Vd equal to the velocity values corresponding to the end-diastole points, i.e., the vertical coordinate values. The peak average velocity Vm equals to an average of peak envelope in one cardiac cycle Vm. The time-averaged flow rate Vt is a weighted average according to the brightness of Doppler blood flow image. FIG. 9 is a schematic diagram illustrating a time-averaged flow rate according to some embodiments of the present disclosure. A dotted line 910 shown in FIG. 9 is the time-averaged flow rate Vt. The resistance index RI equals to (Vs−Vd)/Vs. The beat index PI equals to (Vs−Vd)/Vm. The peak systolic flow rate/end-diastole flow rate ratio (S/D) equals to Vs/Vd. The velocity time integral VTI equals to Vm*HR.

Figure 4:
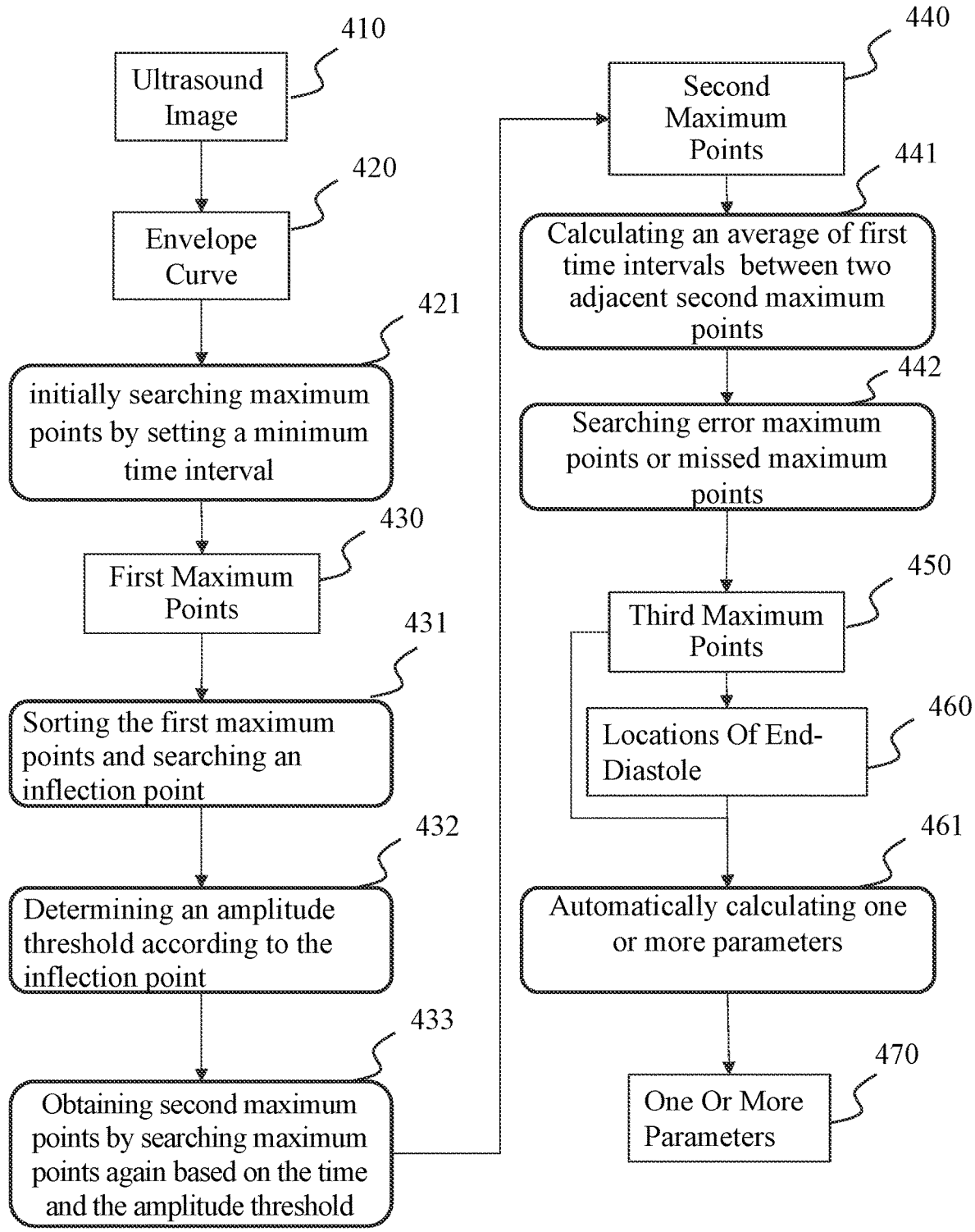
FIG. 4 is a flowchart illustrating an exemplary process for ultrasound image processing according to some other embodiments of the present disclosure.

FIG. 4 is a flowchart illustrating an exemplary process for ultrasound image processing according to some other embodiments of the present disclosure.

As shown in FIG. 4, the process 400 may include step 421, step 431, step 432, step 433, step 441, step 442, and step 461. One or more parameters (, i.e., parameter(s) 470) associated with the blood flow velocity may be obtained from an ultrasound image 410. In some embodiments, one or more steps in process 400 may be performed by the processing device 120.

In some embodiments, the envelope curve determination module 220 may obtain an envelope curve 420 based on the ultrasound image 410. The ultrasound image 410 may be the spectral Doppler blood flow image as shown in FIG. 5. The envelope curve 420 may be the spectral Doppler envelope curve as shown in FIG. 6. More descriptions of how to obtain the ultrasound image and the envelope curve may be found in the relevant descriptions of step 310 and step 320 of FIG. 3, which will not be repeated herein.

In some embodiments, for the envelope curve 420, the first maximum point determination module 230 may set a minimum time interval to initially search the maximum points by step 421, such that the first maximum points 430 are obtained. The searching results may be the plurality of first maximum points as shown in FIG. 7. The first maximum points 430 may include a point 710, a 720, and a 730, etc., in FIG. 7.

In some embodiments, the second maximum point obtaining module 240 may determine the amplitude threshold based on the amplitude features of the plurality of first maximum points.

In some embodiments, the second maximum point obtaining module 240 may sort the plurality of maximum points and search an inflection point by step 431. Specifically, the first maximum points 430 may be sorted according to amplitudes (vertical coordinate value) and a point with a maximum slope change among the plurality of sorted first maximum points may be determined as the inflection point. For example, a point 710 crossed by the dotted line in FIG. 7 may be determined as the inflection point. In some embodiments, the plurality of first maximum points may be sorted from smallest to largest, and a value obtained by subtracting the vertical coordinate value of the previous first maximum point from the vertical coordinate value of the latter first maximum value point may be used as the "slope" of the previous first maximum value point. For example, in FIG. 7, the point 710 has a horizontal coordinate value of 5, and the one latter first maximum point is a point with a horizontal coordinate value of 6. The slope of point 710 is a difference between the vertical coordinate value of the point with a horizontal coordinate value of 6 and the point the vertical coordinate value of 710.

In some embodiments, the second maximum point obtaining module 240 may determine the amplitude threshold according to the inflection point by step 432.

In some embodiments, the second maximum point obtaining module 240 may classify the plurality of first maximum points to obtain the first group and the second group satisfying a classification condition, and determine the amplitude threshold based on numerical features of the first group and the second group. The classification condition may include an intra-group distribution condition of the first group and the second group, and a difference condition between the first group and the second group.

In some embodiments, the intra-group distribution condition of the first group and the second group may be slopes or differences between two adjacent first maximum points, etc. if the slope or difference between two adjacent first maximum points is within a preset range, the first maximum points may be divided in a same group. Exemplarily, as shown in FIG. 7, since the slopes or differences between adjacent points 1-5 are relatively small and the slopes or differences between points 5 and 6 is relatively large, points 1-5 should be in the same group and point 6 should be in another group. It can also be seen that the slopes or differences between adjacent points 6-10 are relatively small and should be in the same group, then in some embodiments, points 1-5 may be divided into the first group and points 6-10 may be divided into the second group. It should be noted that in some embodiments, the difference condition between the first group and the second group may include a range of the first maximum points or an average of the first maximum points. Exemplarily, as shown in FIG. 7, points 1-5 may be divided into one group, and an average of first maximum points in the group is relatively smaller, then points 1-5 may be the first group satisfying the classification condition. Similarly, points 6-10 with a relatively large average of first maximum points may be the second group satisfying the classification condition. It should be noted that in some embodiments, a relatively large average may also be the first group, and a relatively small average value may also be the second group, and the present disclosure does not limit.

In some embodiments, the numerical features of the first group and the second group may be values or vectors, etc., that reflect a value condition of all first maximum points within the first group and the second group. In some embodiments, the numerical features may be an average, a weighted average, or a median, etc., of the plurality of points in each group.

In some embodiments, the first group and the second group may also be divided based on the inflection point determined in step 431. For example, a first average amplitude of a first portion of the sorted first maximum points may be determined preceding the inflection point, a second average amplitude of the second portion of the sorted first maximum points may be determined following the inflection point, and the amplitude threshold may be determined based on the first average amplitude and the second average amplitude. Taking FIG. 7 as an example, the inflection point is point 710, and averages M1 and M2 of upper and lower partial maximum points (for example, the point 720 is an upper partial maximum point and the point 730 is a lower partial maximum point) may be calculated separately by using the dotted line as a boundary, and an amplitude threshold (height threshold) Th2 may be determined according to the following equation:

$$Th2 = coe*M1 + (1-coe)*M2 \qquad (2).$$

where coe denotes an empirical value, e.g., 0.5. The averages M1 and M2 denote the averages of the vertical coordinate values of the maximum points, the second average amplitude denotes M1 and the first average amplitude denotes M2.

In some embodiments, after step 432, the second maximum point obtaining module 240 may search maximum points again based on the time and the amplitude threshold by the step 433, to obtain the second maximum points. Taking FIG. 7 as the example, after amplitude threshold Th2 is determined, the plurality of first maximum points may be screened along the horizontal coordinates, and the first maximum points located above the amplitude threshold Th2 (i.e., the first maximum points whose vertical coordinate values are greater than or equal to the amplitude threshold Th2 (e.g., the point 720)), may be determined as the plurality of second maximum point. The first maximum points located below the amplitude threshold (i.e., the first maximum points whose vertical coordinate values are less than the amplitude threshold (e.g., the point 730)) may be discarded.

In some embodiments, the third maximum point obtaining module 250 may obtain a first time interval between each two adjacent second maximum points of the plurality of second maximum points and a first average time of the first time intervals first average time. For example, the averages of the time intervals between the plurality of second maximum points (i.e., a difference in the horizontal coordinates of the each two adjacent second maximum points) of the second found maximum point may be calculated as the first average time, wherein, the first time interval may be the difference between the horizontal coordinates of the each two adjacent second maximum points. As shown in FIG. 4, for the second maximum points 440, the third maximum point obtaining module 250 may calculate an average of first time intervals between two adjacent second maximum points by step 411, and the first average time may be the average of first time intervals between two adjacent second maximum points calculated by step 441.

In some embodiments, after step 441, the third maximum point obtaining module 250 may search error maximum points or missed maximum points by step 442, thereby correcting the second maximum points 440 to obtain the third maximum points 450.

In some embodiments, for the each two adjacent second maximum points, the third maximum point obtaining module 250 may compare the first time interval corresponding to the two adjacent second maximum points with a first time threshold and a second time threshold. The first time threshold and the second time threshold may be values determined based on the first average time, and the first time threshold may be greater than the second time threshold. The first average time may be recorded as M3, then the first time threshold may be coe2*M3, and the second time threshold may be coe3*M3. The coe2 is greater than coe3, and may be an empirical value (e.g., 2) greater than 1. The coe3 may be an empirical value (e.g., 0.5) less than 1, e.g., 0.5.

In some embodiments, in response to determining that the first time interval is larger than the first time threshold, the third maximum point obtaining module 250 may designate the two adjacent second maximum points and one or more maximum points between the two adjacent second maximum points as third maximum points. Taking FIG. 4 as an example, if the first time interval is greater than the first time threshold coe2*M3, it may be considered that there are missed maximum points, and there are still one or more peaks (i.e., one or more maximum points) between the two adjacent second maximum points corresponding to the first time interval, then the maximum points between the two adjacent second maximum points may be searched again as the third maximum points according to steps 421, 431, 432, and 433.

In some embodiments, in response to determining that the first time interval is smaller than a second time threshold, the third maximum point obtaining module 250 may designate a second maximum point whose time is closest to the first average time in the two adjacent second maximum points as a third maximum point, and deleting another second maximum point in the two adjacent second maximum points. For example, if the first time interval is less than the second time threshold coe3*M3, it may be considered that the two adjacent second maximum points corresponding to the first time interval are not the peaks of the Doppler envelope. There is an error maximum point among them, and the one whose horizontal value between the two maximum points is the closest to the first average time M3 may be selected as an only peak, i.e., the third maximum points, and the other second maximum points may be discarded.

In some embodiments, in response to determining that the first time interval is smaller than or equal to the first time threshold and is larger than or equal to the second time threshold, the third maximum point obtaining module 250 may designate the two adjacent second maximum points as the third maximum points. For example, if the first time interval is less than the first time threshold coe2*M3, and the first time interval is greater than or equal to the second time threshold coe3*M3, the two adjacent second maximum points corresponding to the first time interval may be considered to be both peaks of the Doppler envelope and may be determined as the third maximum points.

In some embodiments, the parameter determination module 260 may obtain the locations of end-diastole 460 based on the third maximum points 450. More descriptions of how to obtain the locations of end-diastole may be found in the relevant descriptions of step 360 of FIG. 3, which will not be repeated herein.

In some embodiments, the parameter determination module 260 may obtain one or more parameters 470 by automatically calculating parameters based on the third maximum points 450 and the locations of end-diastole 460 by step 460. The parameter(s) 470 may be one or more parameters associated with the blood flow velocity, e.g., the heart rate HR, the peak flow rate Vs, the end-diastole flow rate Vd, the peak average velocity Vm, the time-averaged flow rate Vt, resistance index RI, beat index PI, the ratio of a systole peak flow rate to the end-diastole flow rate (S/D), the velocity time integral VTI, etc. More details on how to calculate the parameters may be found in the descriptions of step 360 in FIG. 3, which will not be repeated herein.

Possible beneficial effects of the methods for ultrasound image processing shown in the embodiments of the present disclosure include, but are not limited to, that: (1) the accuracy of peak searching in the ultrasound image (e.g., the spectral Doppler blood flow image) is generally improved by multiple searches, i.e., the peaks are searched first by cardiac cycle intervals and searched again by optimized thresholds. The error peaks are removed by correcting the found maximum points, and the missed peaks are added, which improves the robustness of the peak detection and makes the peak detection more accurate. (2) By searching based on different kinds of features (e.g., the time features, the amplitude features, etc.), factors considered in the maximum searching are more comprehensive, which improves the accuracy of peak searching and reduces the possibility of error and missing. (3) Through the above ways, the stability, comprehensiveness, and accuracy of the found peaks are extremely improved, so that human body parameters with high accuracy that are associated with the blood flow velocity may be obtained based on the above ways. It should be noted that different embodiments may generate different beneficial effects. In different embodiments, the possible beneficial effects may be any one or a combination thereof, or any other beneficial effect that may be obtained.

Figure 10:
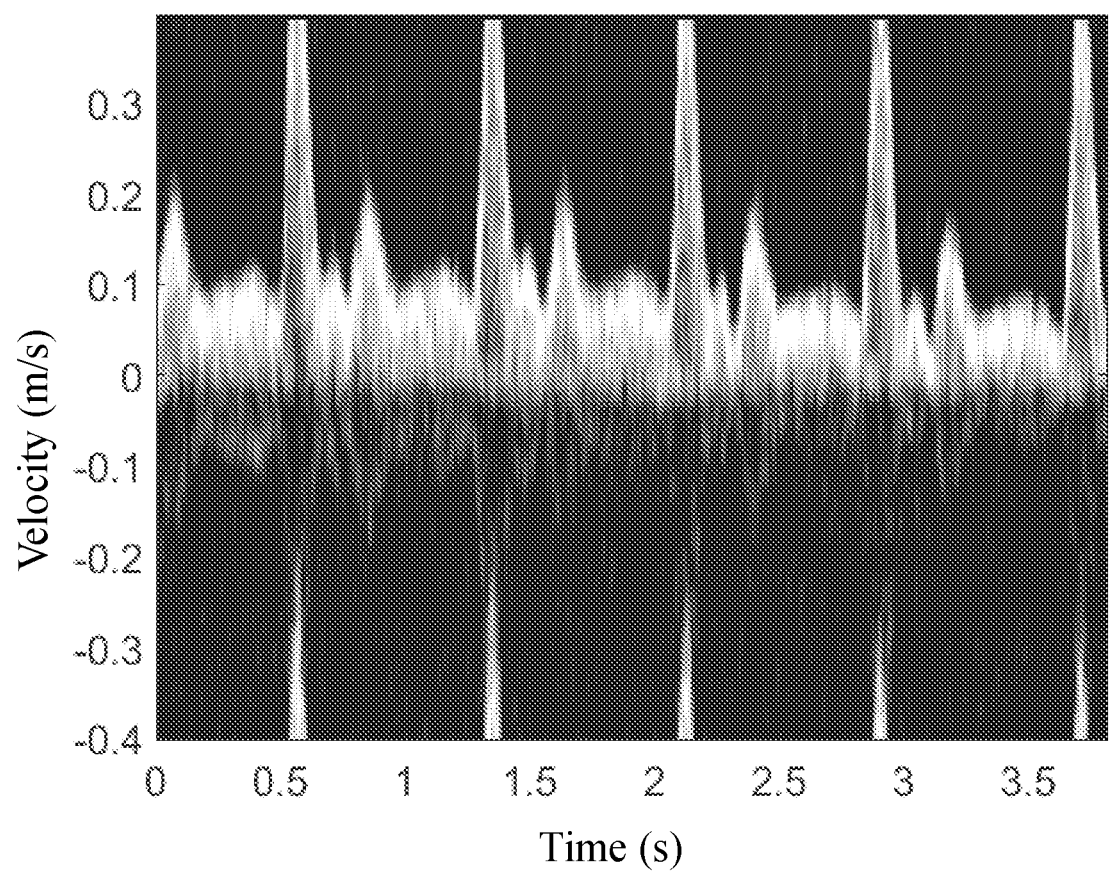
FIG. 10 is a schematic diagram illustrating an ultrasound image according to some embodiments of the present disclosure.

In an exemplary ultrasound image as shown in FIG. 10, there is an aliasing phenomenon on the ultrasound image. In daily diagnosis, a technician may need to eliminate the aliasing phenomenon by manually adjusting pulse repetition frequency (PRF) and centering a blood flow signal by adjusting the baseline location to achieve the optimization of the ultrasound image. Then the technician performs a further processing on the ultrasound image, such as performing process 300 to determine parameters associated with the blood flow velocity. In a CW mode, since the emitted ultrasound waves are continuous, there is no so-called aliasing phenomenon in the ultrasound image, but there is also a need for the technician to move the baseline to center the blood flow signal, wherein the baseline is a horizontal line with zero blood flow velocity on the ultrasound image.

Whether the ultrasound image may automatically adjust the PRF to overcome the aliasing and whether the baseline may be automatically moved so that the blood flow is displayed in the center may be closely associated with the quality of the ultrasound image. Therefore, in step 310, when obtaining the ultrasound image, a binarization threshold may be calculated based on an initial image according to the features of the image, and the ultrasound image may be converted into a binarization image based on the binarization threshold. The corresponding frequency curve diagram may be determined based on the binarization image. Therefore, a repetition frequency and the baseline of the image may be automatically adjusted based on the frequency curve diagram to achieve the best display of the image on the screen and optimize the display quality of the ultrasound image, which improves an optimization efficiency and reduces a labor cost, and has a strong practicality.

Figure 11:
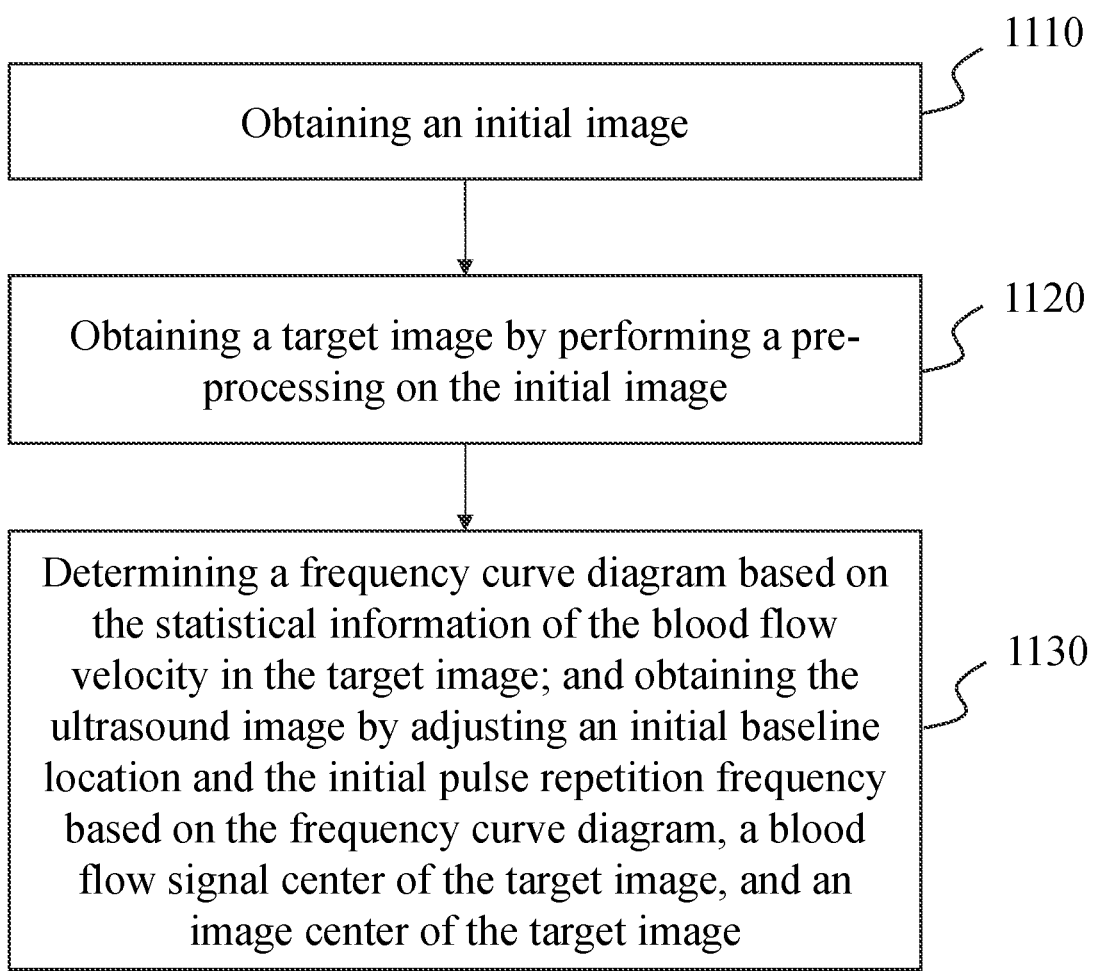
FIG. 11 is a flowchart illustrating an exemplary process for image processing according to some embodiments of the present disclosure.

In one embodiment, as shown in FIG. 11, an ultrasound image (also referred to as an optimized ultrasound image) may be obtained by a performing process 1100, one or more steps in process 1100 may be performed by the processing device 120 or the image obtaining module 210.

Step 1110, an initial image (also referred to as an initial ultrasound image) is obtained. In some embodiments, step 1110 may be performed by an initial image obtaining unit 2410.

In some embodiments, the initial image may be an image generated based on a continuous wave Doppler (CW) mode and/or a pulsed wave Doppler (PW) mode. The ultrasound image may include a blood flow spectrogram, which may reflect conditions including the flow direction of the blood, the blood flow velocity, and a range of variation of the blood flow velocity based on a sampling time. As shown in the aforementioned description, there may be aliasing phenomenon in the initial image, and the baseline of the blood flow signal is not centered, resulting in incomplete display of the blood flow signal, etc. As shown in FIG. 1, the horizontal coordinate indicates time variation of the blood flow signal and the vertical coordinate indicates the variation of the blood flow velocity.

In some embodiments, the initial image has an initial baseline location and an initial pulse repetition frequency (PRF). The initial baseline location may be a horizontal line in the initial image where the blood flow velocity is zero, such as in FIG. 10, where the initial baseline location is between −0.1 and 0.

Step 1120, a target image (also referred to as a target ultrasound image) may be obtained by performing a pre-processing on the initial image. In some embodiments, step 1120 may be performed by a pre-processing unit 2420.

After the initial image is obtained, the initial image may be preprocessed to allow for a more accurate processing of the blood flow signal.

In some embodiments, an image pre-processing may include a binarization processing, de-noising processing, etc. Exemplarily, the binarization processing may be binarization processing based on a global threshold, a local threshold, an adaptive threshold, and other methods. The binarization processing based on the global threshold refers to a binarization of an original image based on a certain preset binarization threshold. The binarization processing based on the local threshold refers to dividing the original image into a plurality of sub-regions and performing the binarization processing on each sub-region based on corresponding preset binarization thresholds. The binarization processing based on the adaptive threshold refers to determining a binarization threshold based on value of each pixel point in the original image, and performing the binarization processing on the original image based on a calculated binarization threshold. Optionally, in some embodiments, the binarization processing may be performed on the initial image by using the adaptive threshold method. In some embodiments, more descriptions regarding the binarization processing may be found in FIG. 13 and its relative descriptions below, which will not be repeated herein.

In some embodiments, the pre-processing may also include obtaining the target image by performing a de-noising processing on one or more connected domains in the initial image. For example, the de-noising processing may be implemented by a wavelet de-noising, an average screen de-noising, a median screen de-noising, a connected domain de-noising, etc. In some embodiments, more descriptions regarding the de-noising processing may be found in the relevant descriptions below, which will not be repeated herein. It should be noted that in some embodiments, a binarization image may be obtained by first performing the binarization processing on the initial image, and then the target image may be obtained by performing the de-noising processing on the binarization image. Or, a denoised image may be obtained by processing the de-noising processing on the initial image, and then the target image may be obtained by performing the binarization processing on the binarization image.

Optionally, the other image pre-processing may also be performed on the initial image. For example, an image clarity processing is performed on the initial image, and if a clarity of the initial image is less than a set threshold, the image clarity processing may be first performed on the initial image, and then the binarization process, the image de-noising process, and other operation may be performed on the initial image.

Step 1130, a frequency curve diagram may be determined based on the statistical information of the blood flow velocity in the target image. The ultrasound image may be obtained by adjusting an initial baseline location and the initial pulse repetition frequency based on the frequency curve diagram, a blood flow signal center of the target image, and an image center of the target image. In some embodiments, step 1130 may be performed by an image optimization unit 2430.

Figure 16:
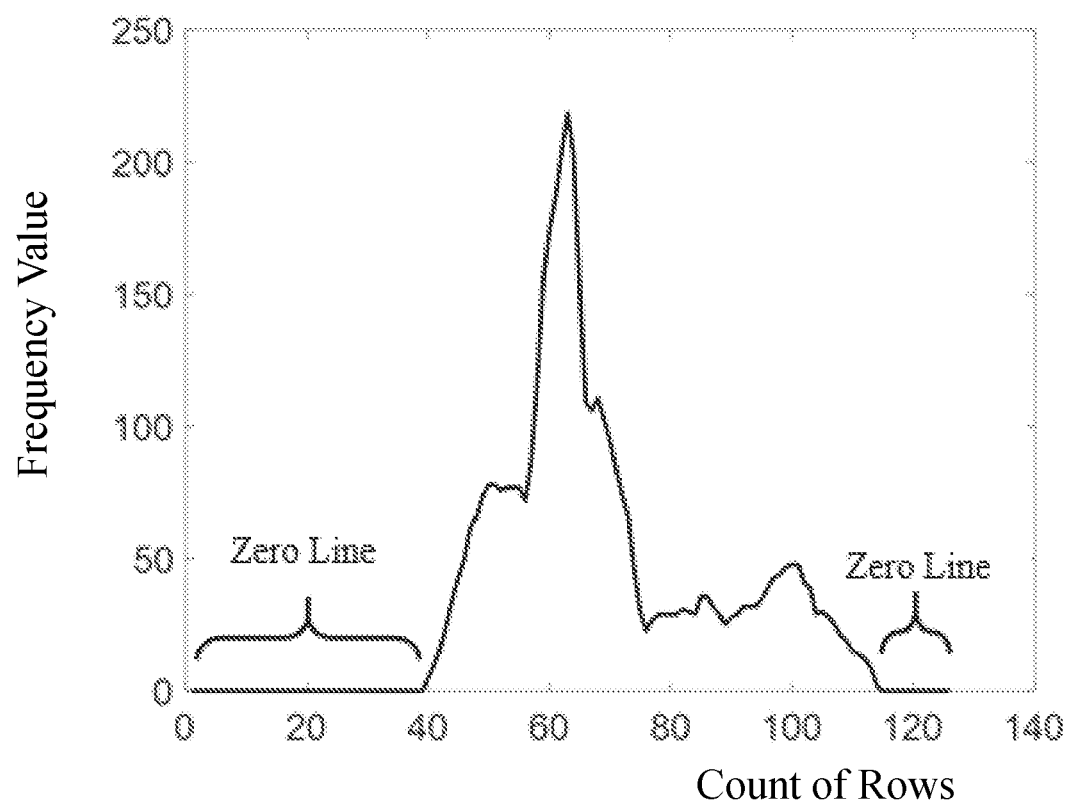
FIG. 16 illustrates a frequency curve diagram according to some embodiments of the present disclosure.

In some embodiments, statistical information (e.g., an accumulated value of pixel values obtained by summing) corresponding to each row of pixels may be obtained based on pixel values of pixel points in each row of pixels, so that the frequency curve diagram is obtained. A pixel value of a pixel point may be an intensity value or a luminance value. It should be noted that in some embodiments, since the binarization processing is performed on the pixel point, its pixel value may be 0 or 1, and the cumulative values of the pixel values of the pixel points in each row may also represent the count of pixel points with a pixel value of 1, to some extent. The count of pixel points with the pixel value of 1 in the each row may be used as a frequency value to form the frequency curve diagram indicating a relationship between a frequency value corresponding to the each row of pixels (the vertical coordinate) and a row in which the pixels are located (the horizontal coordinate) (as shown in FIG. 16). Specifically, in some embodiments, the count of rows of the ultrasound image may be determined according to an image size of the ultrasound image. Exemplarily, if the image size of the target image is 128*128 dpi, the count of rows of the target image may be determined as 128 rows. If the image size of the target image is 32*32 dpi, the count of rows of the target image may be determined as 32 rows.

A curve diagram may include a line segment with the frequency value of zero, a peak point with a maximum frequency value. It may be determined based on the curve diagram to determine whether there is the aliasing phenomenon in the ultrasound image, as well as, a flow direction of the blood flow signal in the target image based on the peak point with the maximum frequency value, etc. Therefore, the ultrasound image may be obtained by adjusting the initial baseline location and the initial pulse repetition frequency based on the curve diagram, the blood flow signal center of target image and the image center of target image.

In some embodiments, the flow direction of the blood flow signal may be determined based on the frequency curve diagram. The blood flow signal center may be determined by a starting row and an ending row of the blood flow signal of the ultrasound signal. The image center may be obtained based on the count of rows of the target image. Such that an initial baseline location of the ultrasound image may be adjusted to cause the blood flow signal to be located at the center of image. More descriptions regarding the blood flow signal and an adjustment of baseline location may be found in step 1530 and its related descriptions, which will not be repeated herein.

In some embodiments, the initial pulse repetition frequency of the target image may be adjusted according to a preset pulse repetition frequency adjustment method and/or an adjustment stepping, so that the aliasing phenomenon in the target image is removed to obtain an ultrasound image that is located at the center of image and without the aliasing phenomenon.

In the above method for image processing, the ultrasound image may be obtained by pre-processing the initial image, and the frequency curve diagram corresponding to the ultrasound image may be obtained by further analyzing the ultrasound image in a frequency domain, so that the ultrasound image is obtained by adjusting the initial baseline location and the initial pulse repetition frequency of the target image based on the frequency curve diagram. In this way, there is no aliasing phenomenon in the ultrasound image. Moreover, the blood flow signal in the ultrasound image may be displayed centrally in the image, which reduces an operation of manually adjusting the image and improves an efficiency of image optimization while optimizing an image display effect.

Step 1120, the image pre-processing performed on the initial image may include the binarization processing and the de-noising processing, which will be described separately below.

Performing the binarization processing on the initial image may separate the blood flow signal from a background noise. As shown in FIG. 12, the steps of binarization processing may include the following steps.

Step 1210, pixel points in the initial image may be sorted to form a pixel value-pixel point count image based on the pixel values of the pixel points in the initial image.

In some embodiments, the pixel value of the pixel point may be the intensity value or the luminance value. A pixel value-pixel point count image with the pixel value of the pixel point on the vertical axis and the count of pixel points on the horizontal axis may be obtained by sorting the all pixel points in the initial image. Exemplarily, the pixel value-pixel point count image may be shown in FIG. 13.

In some embodiments, to reduce data chance, an empirical parameter may also be determined according to a cutoff frequency of a wall filter before performing step 1210, based on which some abnormal pixel points (e.g., over-bright points) may be screened out. Specifically, the empirical parameter may be set to a, and a % of abnormal over-bright points may be screened out according to a sequential arrangement of the pixel values of the all pixel points. For example, the empirical parameter a may be 3. Optionally, the pixel value-pixel point count image may also be obtained by sequentially arranging the pixel values of the all pixel points close to the baseline of the initial image (e.g., within a ±0.5 range of the baseline) merely.

Step 1220, a point at a first location and a point at a second location are connected to form a reference line.

In some embodiments, the point at the first location may be a point with the smallest pixel value on the pixel value-pixel point count image. The point at the second location may be a point with a largest pixel value on the pixel value-pixel point count image. Continuously taking FIG. 13 as an example, the point at the first location is point A and the point at the second location is point B. The dotted line in the FIG. 13, i.e., the reference line, may be obtained by connecting the point A and the point B.

Step 1230, the point on the pixel value-pixel point count image farthest from the reference line may be used as a binarization threshold point.

The binarization threshold may be determined based on the pixel value of the binarization threshold point. The pixel points may be divided into two groups greater than the binarization threshold and less than the binarization threshold based on the pixel values of the pixel points in the initial image, and new values may be designate to the two groups of the pixel points so that the values of designated pixel points only include two values.

Figure 13:
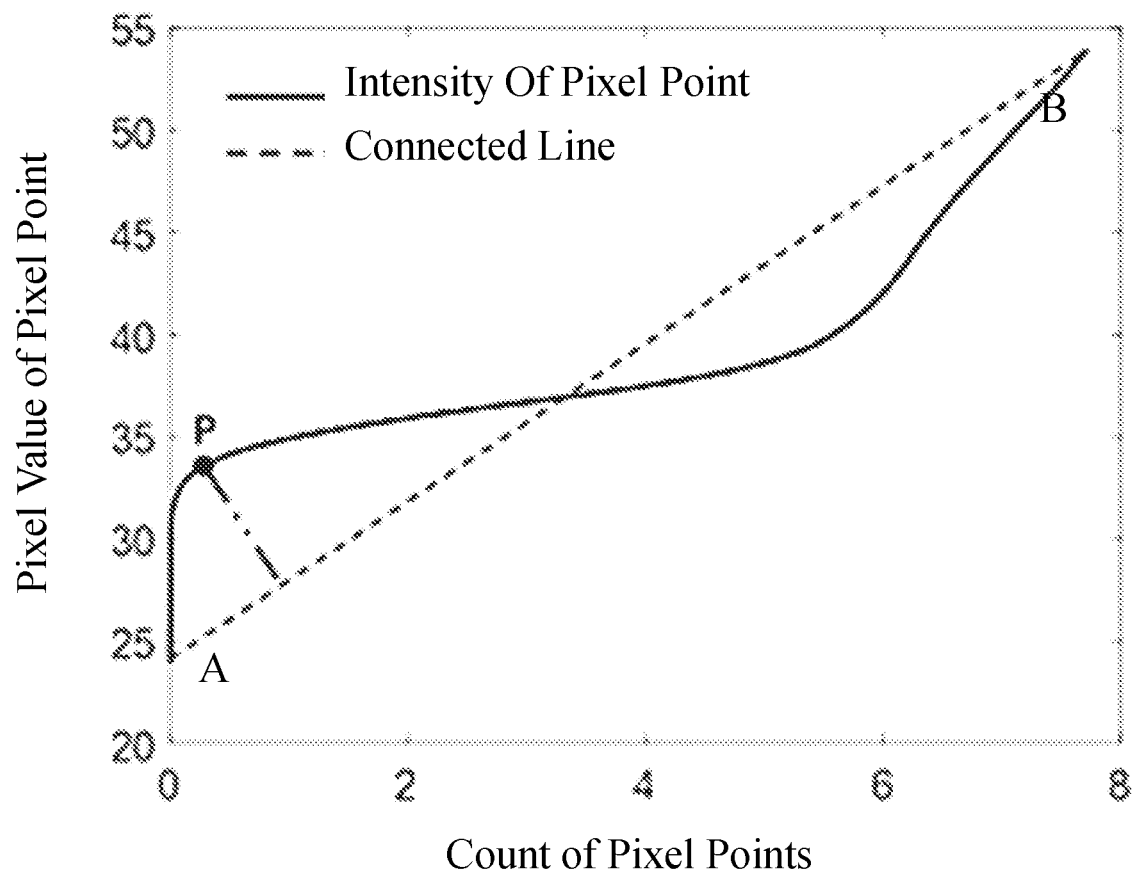
FIG. 13 is a schematic diagram illustrating an exemplary pixel value-pixel point count image according to some embodiments of the present disclosure.

In some embodiments, the point farthest from the reference line may be used as a demarcation point between a spectral image signal and the noise, i.e., the binarization threshold point. In FIG. 13, the point farthest from the dotted line is point P, i.e., the binarization threshold point.

Step 1240, a binarization threshold may be determined based on the binarization threshold point, wherein the binarization threshold is used for binarization processing.

In some embodiments, the pixel value of the binarization threshold point may be used as the binarization threshold, or its pixel value may be multiplied with a preset coefficient as the binarization threshold. Exemplarily, assuming that the pixel value of the binarization threshold point P is p, p*b may be used as the demarcation point between the spectral image signal and the noise, i.e., the binarization threshold. A coefficient b is an empirical parameter, and its specific value may be defined according to the SNR of the ultrasonic diagnostic instrument, or it may be set as a fixed value according to the expert experience. Exemplarily, the value of the coefficient b may be taken around 1, and b may be less than 1 or greater than 1, which will not be limited by the present embodiment.

In some embodiments, the binarization processing may be performed on the pixel points in the initial image based on the binarization threshold. Specifically, for the each pixel point, the following two cases may be included.

In one case, if the pixel value of the pixel point in the initial image is less than the binarization threshold, the pixel value of the pixel point may be determined as a first value. Optionally, the first value may be 0.

In another case, if the pixel value of the pixel point in the initial image is greater than or equal to the binarization threshold, the pixel value of the pixel point may be determined as a second value. Optionally, the second value may be 1.

In some embodiments, the abnormal pixel points in the initial image after the binarization process may be further reduced by performing the de-noising processing on the initial image after the binarization processing. Optionally, the de-noising processing may be performed on one or more connected domains in the ultrasound image after the binarization processing that has a relatively small area or, alternatively, includes relatively few pixel points. Exemplarily, a pixel point count threshold corresponding to connected domains may be set. The count of pixels included in each connected domain in the initial image after the binarization processing may be calculated. If the count of pixels in a connected domain is smaller than the first pixel point count threshold, the connected domain may be removed. Or, a second pixel point count threshold corresponding to the connected domains may be set, the count of pixels included in the each connected domain in the initial image after the binarization processing may be calculated. if the count of pixels of a connected domain is greater than the second pixel point count threshold, the connected domain may be remained.

In general, a connected domain including a small count of pixel points may be considered as a noisy region. In some embodiments, the count of pixel points included in connected domain may be calculated after determining the connected domains in the initial image after the binarization processing, and the count of pixel points in each connected domain may be compared with the first pixel point count threshold. If the count of pixels in a connected domain is smaller than the first pixel point count threshold, the connected domain may be removed. Exemplarily, the first connected domain pixel count threshold may be 30, or, alternatively, it may be determined based on an actual initial image size, a hardware noise of a system, and image quality after binarization.

Optionally, in some embodiments, the target image may be obtained by performing a de-noising processing on one or more connected domains in the initial image after the binarization processing, which may include the following operations. The one or more connected domains in the initial image may be obtained. In response to a determination that the count of pixel points in a connected domain among the one or more connected domains is smaller than a third pixel point count threshold, the target image is obtained by updating the pixel values of pixel points in the connected domain with the first value or obtained by updating the pixel values of pixel points greater than the first value in the connected domain with the first value. It should be noted that there is no correlation among the above first pixel point count threshold, the second pixel point count threshold, and the third pixel point count threshold, which may be the same or different.

Figure 14:
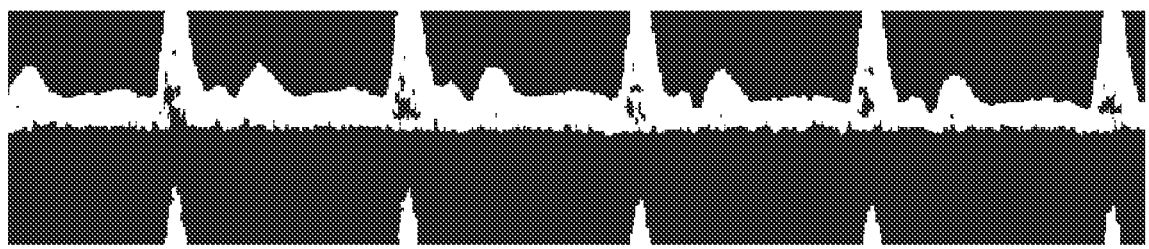
FIG. 14 is a schematic diagram illustrating an ultrasound image obtained by performing a de-noising processing on one or more connected domains according to some embodiments of the present disclosure.

In some embodiments, a plurality of connected domains in the initial image after binarization processing may be determined according to the initial image after binarization processing (e.g., based on the value of each pixel point in the binarization-processed initial image). A connected domain may be understood as a connected region where the pixel value of the pixel point is the second value. The image after the binarization processing and the image de-noising processing may be referred to FIG. 14.

In some embodiments, the blood flow signal may be may be separated from a background noise in the initial image by performing the binarization processing on the initial image. The de-noising processing may be performed on the initial image after binarization. Since the blood flow signal is continuous in a time and frequency direction on the spectrogram, connected domains occupy more pixels, while the noise after binarization is more random and occupies relatively less pixels, so the de-noising processing for the connected domain may be set to remove a relatively smaller speckle noise, thereby obtaining the target image with reduced noise and relatively high image quality.

Each of one or more line segments with a frequency value of zero in the frequency curve diagram may be defined as a "zero line". In some embodiments, a type of target image may be determined based on whether there are zero line(s) in the frequency curve diagram and locations of the zero line(s).

Specifically, if there are no zero line(s) in the frequency curve diagram, it means that the blood flow signal exists at all frequencies, that is, the initial pulse repetition frequency is too low, and the initial pulse repetition frequency needs to be adjusted upward. If the zero line(s) are located at a middle end of the curve in the frequency curve diagram, it means that there is the aliasing phenomenon, and the initial pulse repetition frequency needs to be adjusted upward. If the zero line(s) in the frequency curve diagram are located at a beginning or an end of the curve in the frequency curve diagram, it means that the blood flow signal only exists in one direction, and there is no aliasing phenomenon, then it means that the blood flow signal exists in only one direction and there is no aliasing phenomenon, or, the blood flow is a bidirectional non-aliasing signal and the initial pulse repetition frequency may not be adjusted. Therefore, the initial pulse repetition frequency may be adjusted upward by step 1510 so that there are zero line(s) in the frequency curve diagram. The frequency curve diagram clearly indicates whether the target image has the aliasing phenomenon by the locations of the zero line(s) based on the frequency curve diagram, so that the pulse repetition frequency may be adjusted in a timely manner, and the adjustment efficiency of the pulse repetition frequency is improved.

Figure 15:
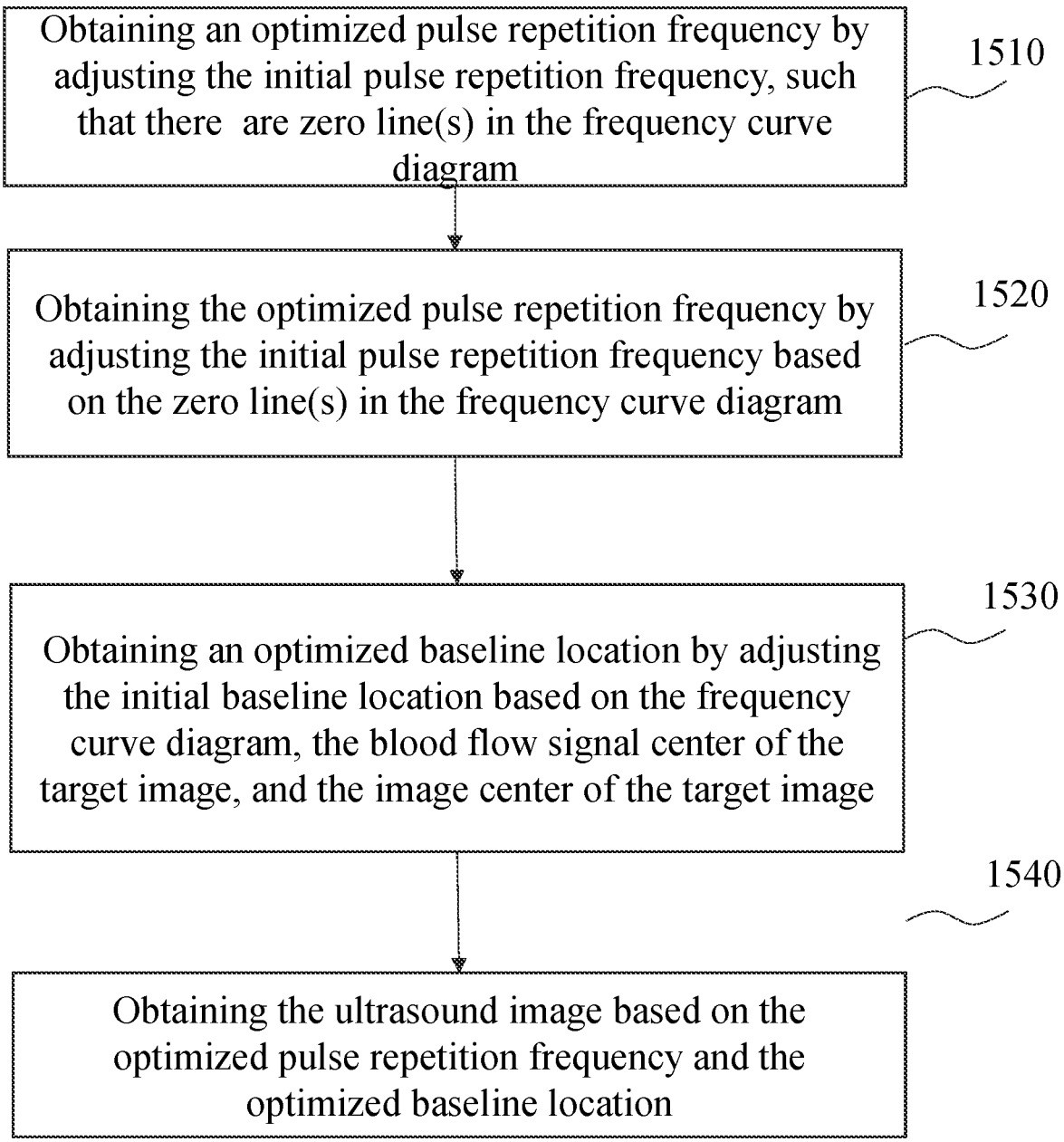
FIG. 15 is a flowchart illustrating an exemplary process for image processing according to some embodiments of the present disclosure.

In some embodiments, for the ultrasound image that needs to adjust the pulse repetition frequency, the obtaining of the ultrasound image by adjusting the initial baseline location and the initial pulse repetition frequency based on the frequency curve diagram, a blood flow signal center of the target image, and an image center of the target image may be achieved by operations shown in FIG. 15.

As previously described herein, there may or may not be zero line(s) in the frequency curve diagram. In some embodiments, in response to determining that there is no zero line(s) in the frequency curve diagram, step 1510 may be performed.

Step 1510, an optimized pulse repetition frequency may be obtained by adjusting the initial pulse repetition frequency, such that there are zero line(s) in the frequency curve diagram.

In some embodiments, after adjusting upward the initial pulse repetition frequency, a new frequency curve diagram may be obtained by re-executing step 1120 until the initial pulse repetition frequency reaches the optimized pulse repetition frequency. In some embodiments, the optimized pulse repetition frequency may be greater than the initial pulse repetition frequency.

In some embodiments, step 1510 may not be performed if there are zero line(s) in the frequency curve diagram.

As mentioned above, if there are zero line(s) in the frequency curve diagram that are located at the beginning or the end of the curve in the frequency curve diagram, it means that the blood flow signal exists only in one direction and there is no aliasing, and if there are zero line(s) in the frequency curve diagram that are located at the middle end of the curve in the frequency curve diagram, it means that there is aliasing phenomenon. As shown in FIG. 16, the zero line(s) are located at the beginning and the end portion of the curve in FIG. 16. In this case, it indicates that there is no aliasing phenomenon in the image and the initial pulse repetition frequency may not be adjusted, i.e., the initial pulse repetition frequency is determined as the optimized pulse repetition frequency. In some embodiments, step 1520 may not be performed for the case when there are zero line(s) in the frequency curve diagram and the zero line(s) are located at the beginning or the end of the curve in the frequency curve diagram, or when the zero lines are obtained after performing step 1510 and the zero line(s) are located at the beginning end or the end of the curve in the frequency curve diagram.

In some embodiments, in response to determining that there are zero line(s) in the frequency curve diagram, and the zero line(s) are not located at the beginning or the end of the curve in the frequency curve diagram, step 1520 may be performed.

Step 1520, the optimized pulse repetition frequency may be obtained by adjusting the initial pulse repetition frequency based on the zero line(s) in the frequency curve diagram.

Figure 17:
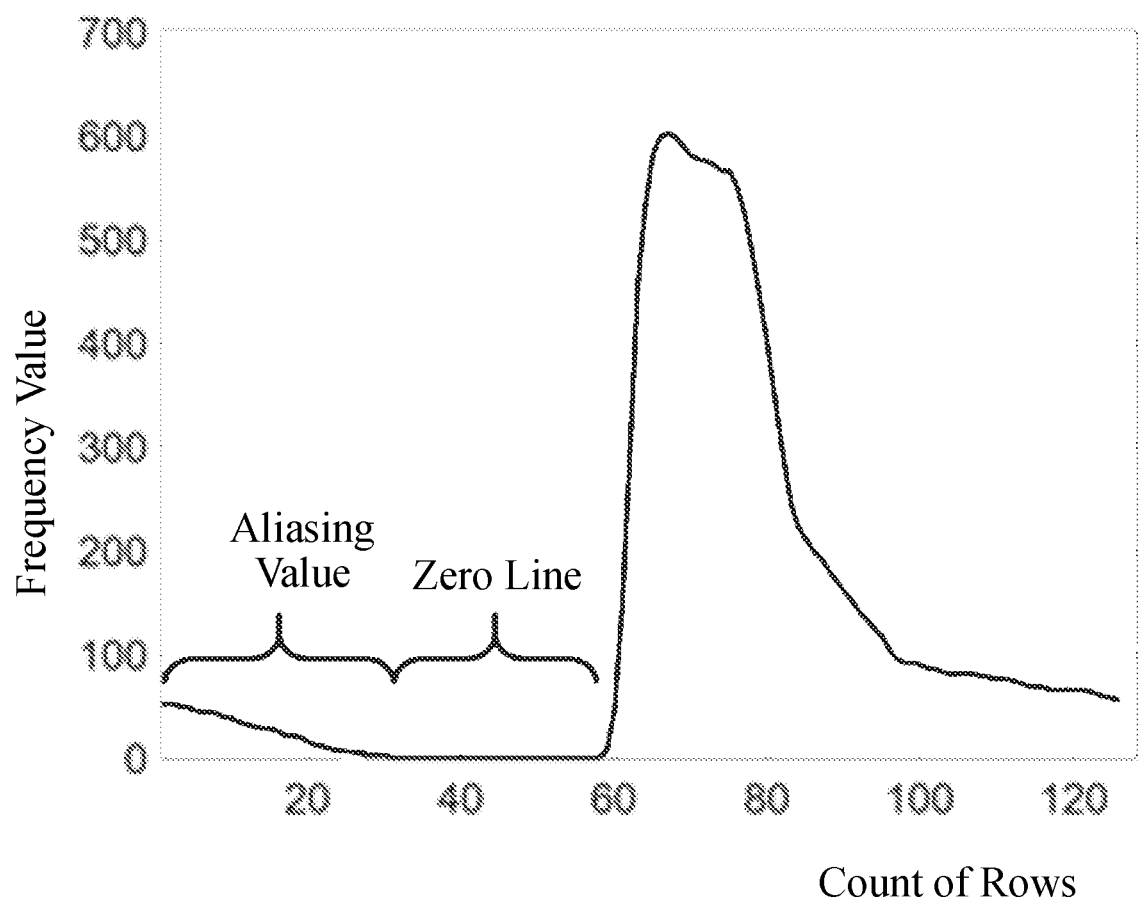
FIG. 17 illustrates another frequency curve diagram according to some other embodiments of the present disclosure.

Referring to FIG. 17, a zero line in the FIG. 17 is located at the middle end of the curve in the frequency curve diagram, which indicates the presence of the aliasing phenomenon. Optionally, the initial pulse repetition frequency may be adjusted upward based on the adjustment of PRF=PRF+K1 or PRF=PRF*K2, and after T time, the ultrasound image with a length of T time is generated based on the adjusted pulse repetition frequency, wherein the K1 and K2 may be set to fixed values, and the T may be set to 1 second. It should be noted that the pulse repetition frequency may also be adjusted in step 1510 by using the above method.

Figure 18:
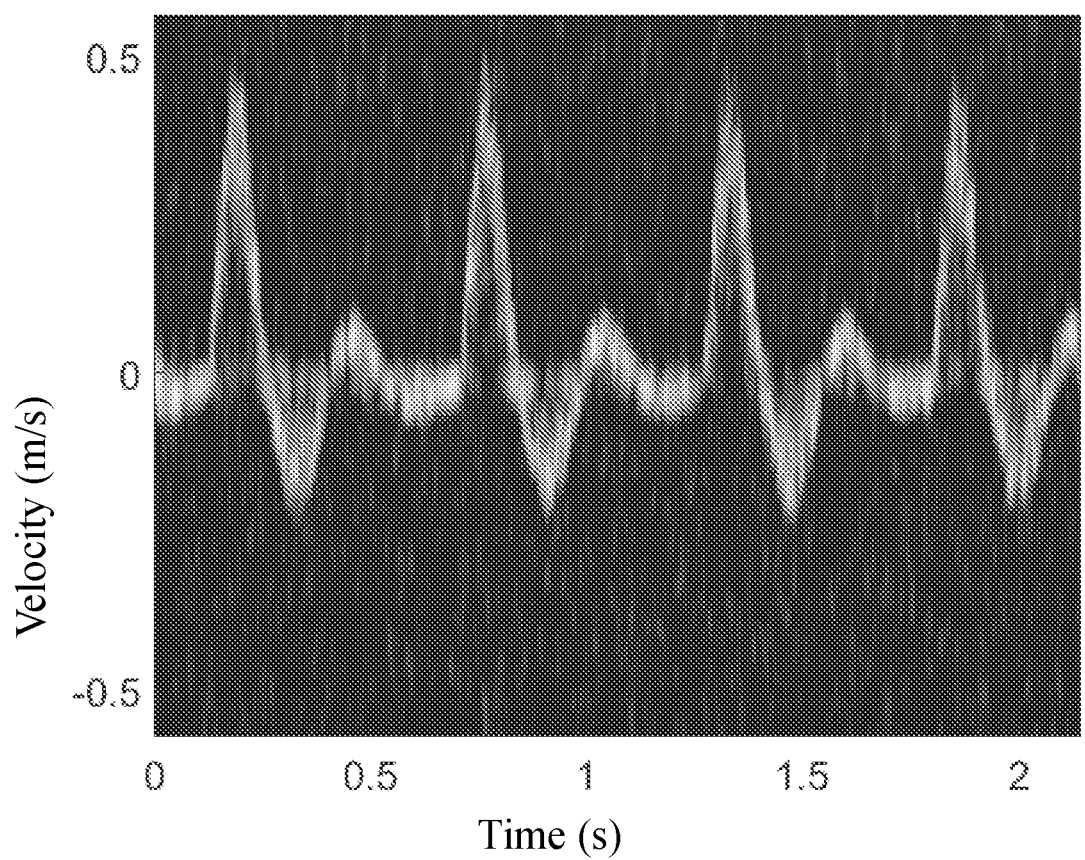
FIG. 18 is a schematic diagram illustrating an initial ultrasound image according to some embodiments of the present disclosure.

In some embodiments, as shown in FIG. 18, there may not be the aliasing phenomenon in the initial image. However, the blood flow signal is shown leaning up in a whole ultrasound image, and to further facilitate the technician to observe and analyze the blood flow signal, a display effect may be further optimized by adjusting the initial baseline location, so that the blood flow signal is displayed centrally in the ultrasound image. In step 1530, an optimized baseline location may be obtained by adjusting the initial baseline location based on the frequency curve diagram, the blood flow signal center of the target image, and the image center of the target image.

In some embodiments, in response to the determination that there is no aliasing phenomenon, the baseline location of peak of frequency value in the frequency curve diagram may be adjusted to the optimized baseline location based on the image center of the target image, the blood flow signal center, and the peak of the frequency value in the frequency curve diagram.

The blood flow signal center may refer to a horizontal line corresponding to half of a difference between the highest and lowest values of the blood flow velocity in the ultrasound image or the average value of the blood flow velocity in the ultrasound image. The image center of the ultrasound image may be a horizontal line at the center of the ultrasound image.

In some embodiments, for a bi-directional blood flow image without aliasing phenomenon, or for the ultrasound image where the aliasing phenomenon is eliminated after adjustment, a baseline displacement may be calculated to adjust the initial baseline location to the optimized baseline location, such that a moved blood flow signal is located in the middle of the image. Exemplarily, the baseline displacement may be a difference of an image center location of the target image minus a center location of the blood flow signal of the target image. It should be noted that the method of a baseline location adjustment may also be other common ways, which are not limited by the present disclosure. It should to be noted that the pulse repetition frequency or the baseline location may not be adjusted necessarily according to an actual situation of the ultrasound image, and therefore, in some embodiments, one or more of the above steps 1510 to 1530 may not be performed.

Step 1540, the ultrasound image may be obtained based on the optimized pulse repetition frequency and the optimized baseline location.

Figure 19:
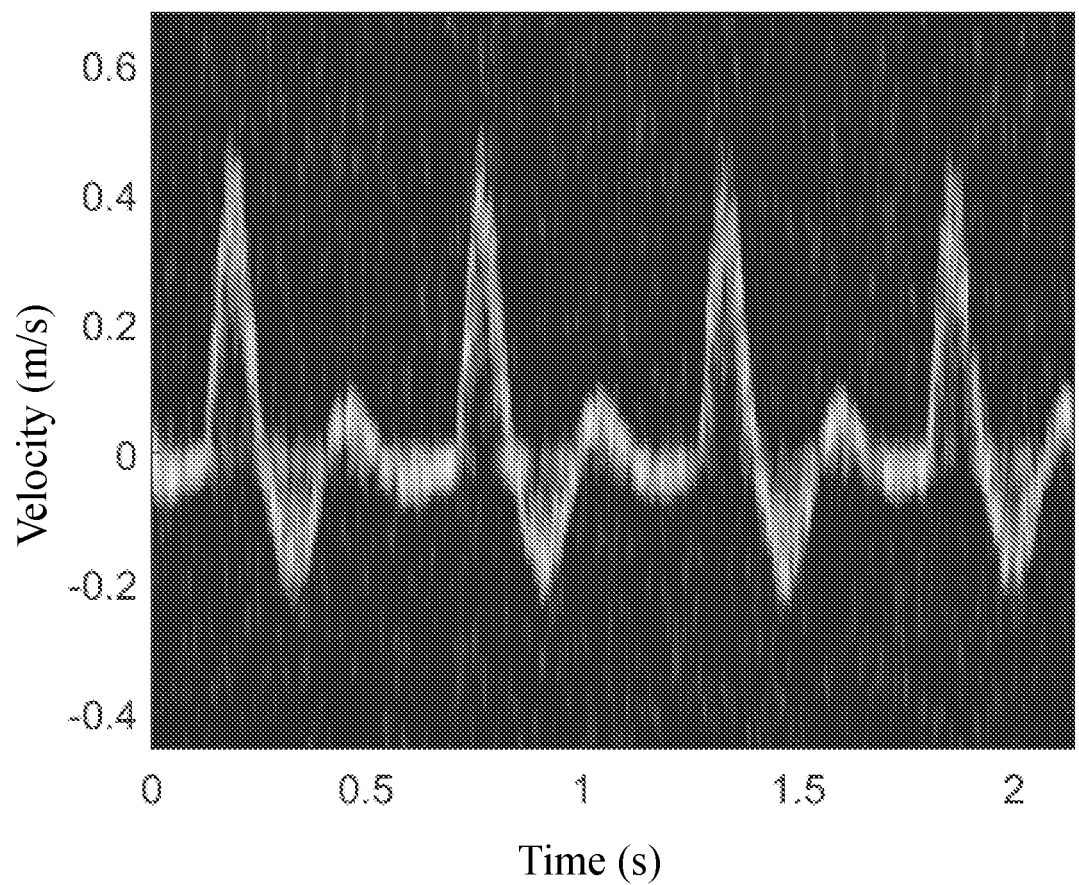
FIG. 19 illustrates an ultrasound image obtained by processing the initial image in FIG. 18 according to some embodiments of the present disclosure.
Figure 20:
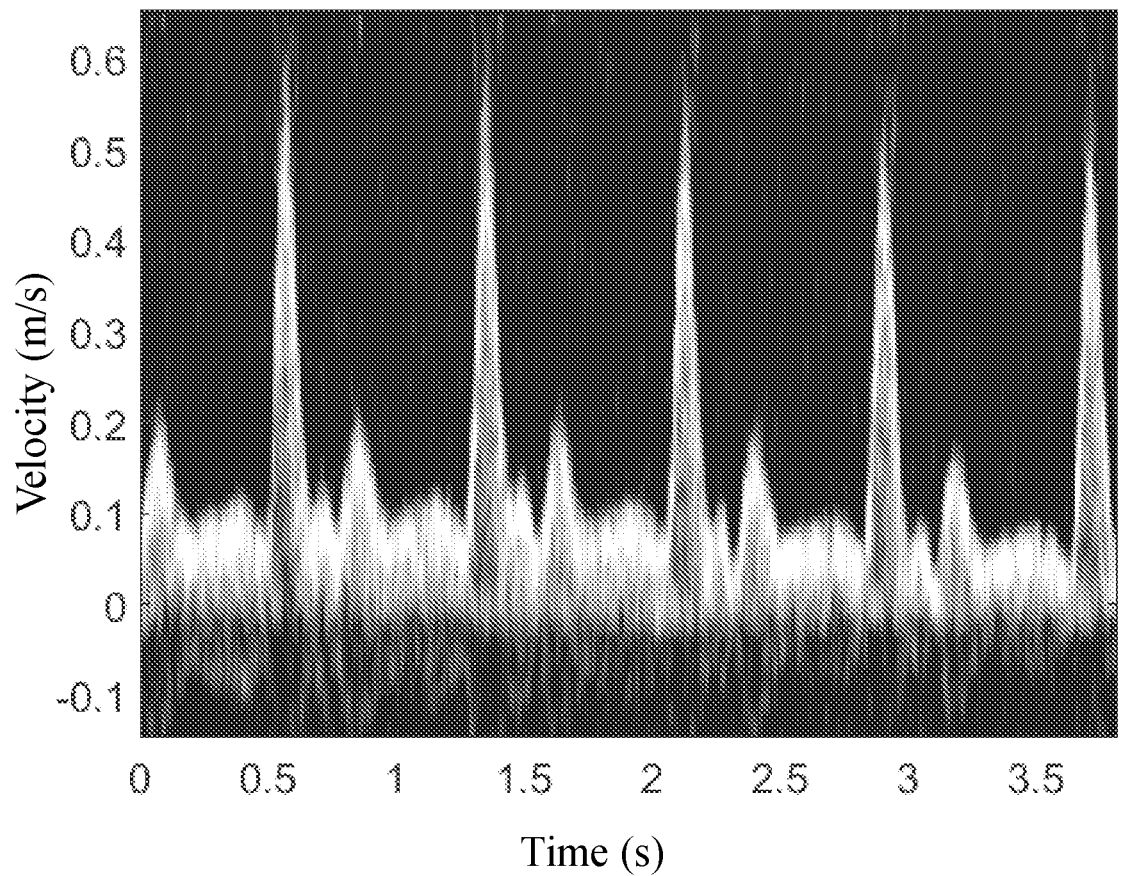
FIG. 20 illustrates an ultrasound image obtained by processing the initial image in FIG. 10 according to some embodiments of the present disclosure.

In some embodiments, the initial baseline location may be adjusted to the optimized baseline location and the ultrasound image may be generated based on the optimized pulse repetition frequency and the optimized baseline location. Exemplarily, for the initial image shown in FIG. 18, further the baseline location may be adjusted to obtain the corresponding ultrasound image shown in FIG. 19. In some other embodiments, adjusting a pulse repetition frequency and the baseline location in FIG. 10 to obtain the corresponding ultrasound image shown in FIG. 20.

Figure 21:
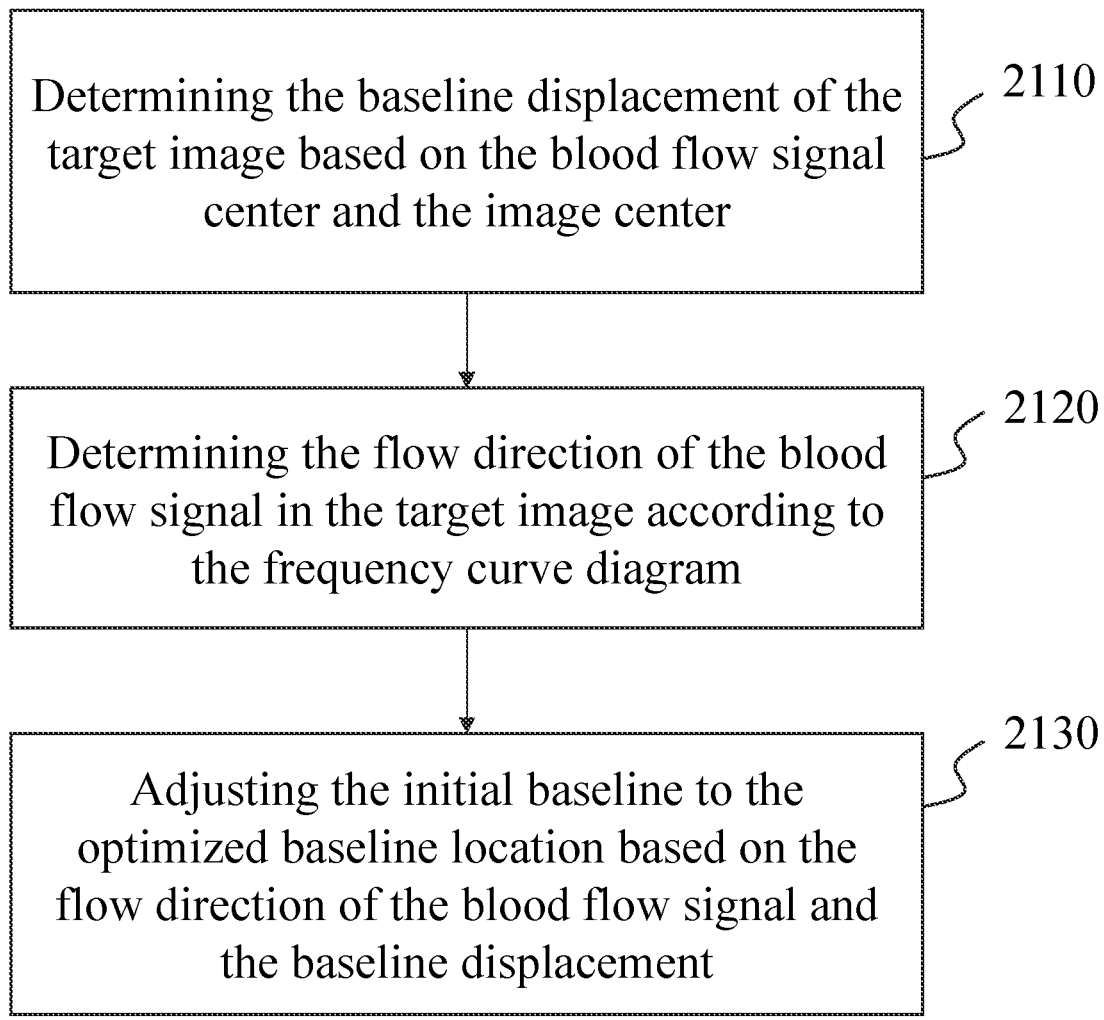
FIG. 21 is a flowchart illustrating an exemplary process for image processing according to some other embodiments of the present disclosure.

In some embodiments, referring to FIG. 21, the step of adjusting the initial baseline location in step 1530 may include the following steps.

Step 2110, the baseline displacement of the target image may be determined based on the blood flow signal center and the image center.

In some embodiments, the location of the blood flow signal center and the location of the image center of the target image may be obtained, and the difference between the location of the image center and the location of the blood flow signal center may be determined as a baseline displacement ΔBaseline of the target image.

Step 2120, the flow direction of the blood flow signal in the target image may be determined according to the frequency curve diagram.

In some embodiments, the flow direction indicated by the blood flow signal may be determined based on the peak of the frequency value in the frequency curve diagram and the image center. Exemplarily, referring to the frequency curve diagram shown in FIG. 17, assuming that a size of the target image is 128*128 dpi, i.e., the target image includes 128 rows, a portion of the target image whose frequency pixels are greater than 64 (the right half of the image frequency curve diagram) may be significantly higher than a portion of the target image whose frequency pixels are less than 64 (the left half of the image frequency curve diagram), which means that an intensity of a positive blood flow signal is larger than a negative blood flow signal, so that the blood flow direction is positive. When the blood flow direction is positive, it means that the direction of blood flow is close to an ultrasonic probe, and when the blood flow direction is negative, it means that the direction of blood flow is far away from the ultrasonic probe. Step 2130, the initial baseline location may be adjusted to the optimized baseline location based on the flow direction of the blood flow signal and the baseline displacement.

Figure 22:
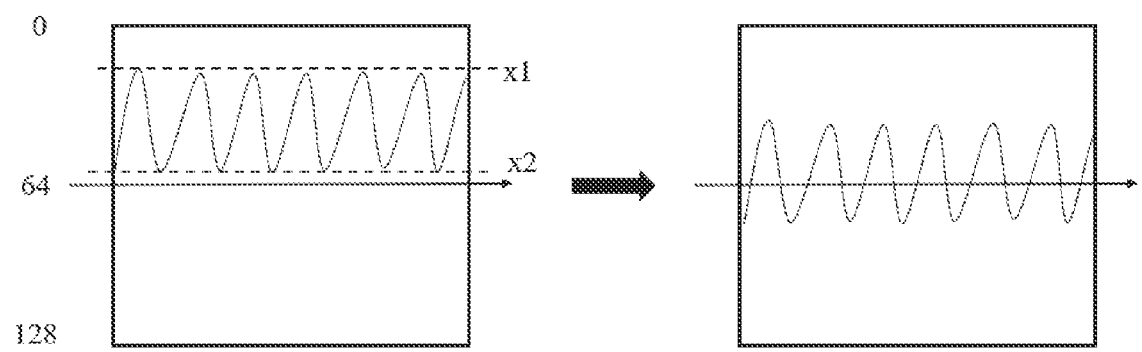
FIG. 22 is a schematic diagram illustrating a comparison diagram between ultrasound images generated before and after adjusting a baseline location thereof according to some embodiments of the present disclosure.

In some embodiments, after the baseline displacement ΔBaseline is calculated and the flow direction of the blood flow signal is determined, the computer device may adjust the baseline location based on the baseline displacement ΔBaseline and the flow direction. Still taking the above size of target image being 128*128 dpi as example for illustration, the initial baseline location of the target image is 64. Assuming that a beginning row and an ending row of the blood flow signal is $x_1$ and $x_2$, the blood flow signal center is $(x_1+x_2)/2$, then the baseline displacement ΔBaseline equals to $64-(x_1+x_2)/2$. It should be noted that, if the direction of blood flow is positive, then ΔBaseline is a positive number, which means a ΔBaseline distance is moved in the positive direction. If the direction of blood flow is negative, then ΔBaseline is a negative number, which means the ΔBaseline distance is moved in the negative direction. A comparison diagram between ultrasound images generated before and after adjusting a baseline location thereof may be referred to FIG. 22. As shown in the left side of FIG. 22, the blood flow signal is in an upper location of the image before the baseline location is adjusted, and as shown in the right side of FIG. 22, the blood flow signal is in the middle of the image after the baseline location is adjusted.

In some embodiments, the baseline displacement may be calculated based on the blood flow signal center and the image center, thereby adjusting the blood flow signal to the middle of the image, such that the display effect of the blood flow signal may be improved.

In some embodiments, the aliasing phenomenon in the target image may be eliminated by adjusting the pulse repetition frequency, so that the blood flow signal may be displayed intact in the target image. The blood flow signal may be centered in the target image by adjusting the baseline location, so that display effect of the blood flow signal may be optimized in the target image.

Figure 23:
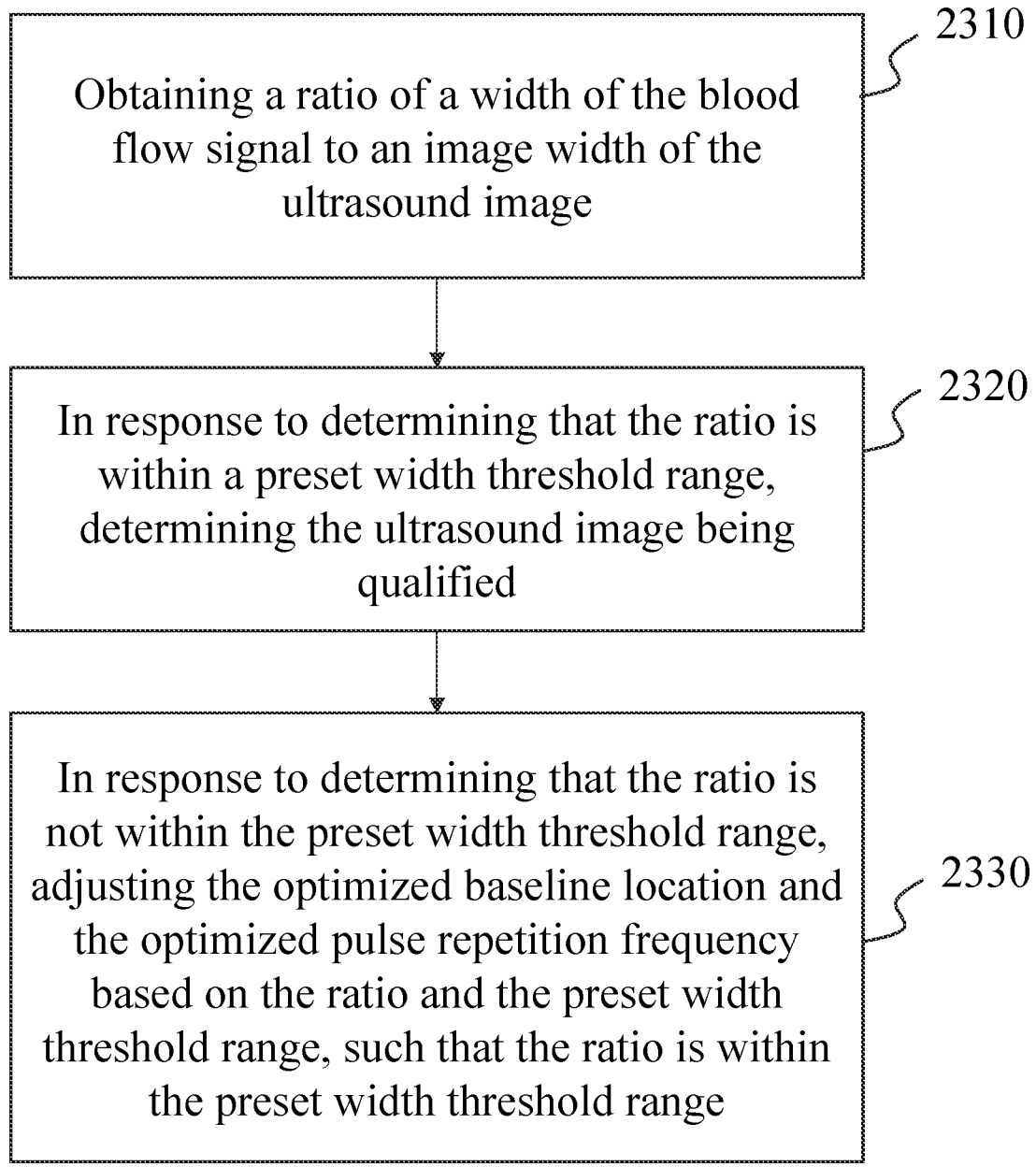
FIG. 23 is a flowchart illustrating an exemplary process for image processing according to some other embodiments of the present disclosure.

In some embodiments, a process of determining the ultrasound image (also referred to as the ultrasound optimized image) may be shown in FIG. 23, to further validate the image display effect of the ultrasound image, the method further includes the following steps.

Step 2310, a ratio of a width of the blood flow signal to an image width of the ultrasound image may be obtained.

In some embodiments, the width of the blood flow signal in a column direction of the ultrasound image may be obtained. Exemplarily, the width of the blood flow signal may be determined based on locations of the starting row and the ending row according to the blood flow signal. After obtaining the width of the blood flow signal, the ratio of the width of the blood flow signal to the image width of the ultrasound image L may be calculated. Exemplarily, if the width of the ultrasound image is 128, the starting row of the blood flow signal is 13 and the ending row is 103, the width of the blood flow signal may be 90, and the ratio may be L=90/128≈70%.

Step 2320, in response to determining that the ratio is within a preset width threshold range, the ultrasound image may be determined qualified.

In some embodiments, the preset width threshold range may be set according to the actual situation, for example, it can usually be set to 50%~75%. The above example may be used for calculation, if the ratio L is about 70% and within the preset width threshold range, it may be determined that the ultrasound image is qualified.

Step 2330, in response to determining that the ratio is not within the preset width threshold range, the optimized baseline location and the optimized pulse repetition frequency may be adjusted based on the ratio and the preset width threshold range, such that the ratio is within the preset width threshold range.

Optionally, if the ratio L is smaller than 50%, the pulse repetition frequency and the baseline location may be adjusted according to the ratio. For example, the pulse repetition frequency and the baseline location may be adjusted according to the following equations (3) and (4):

$$PRF=PRF/(50\%/L) \qquad (3);$$

$$\Delta Baseline=\Delta Baseline*(50\%/L) \qquad (4).$$

If the ratio L is greater than 75%, exemplarily, the pulse repetition frequency and the baseline location may be adjusted according to the following equations (5) and (6):

$$PRF=PRF/(75\%/L) \qquad (5);$$

$$\Delta Baseline=\Delta Baseline*(75\%/L) \qquad (6).$$

Therefore, the ultrasound image may be verified twice, so that the ultrasound image is qualified and the ultrasound image that meets display effect requirements is obtained.

In some embodiments, after the image pre-processing is performed on initial image, the target image may be obtained. The frequency curve diagram corresponding to the target image may be obtained by analyzing the target image in the frequency domain, so that the initial baseline location and the initial pulse repetition frequency of the target image may be adjusted based on the frequency curve diagram to obtain the ultrasound image, and there may be not the aliasing phenomenon in the ultrasound image. Moreover, the blood flow signal in the ultrasound image may be displayed centrally in the image, which reduces the operation of manually adjusting the initial image and improves the efficiency of image optimization while optimizing the image display effect.

Figure 24:
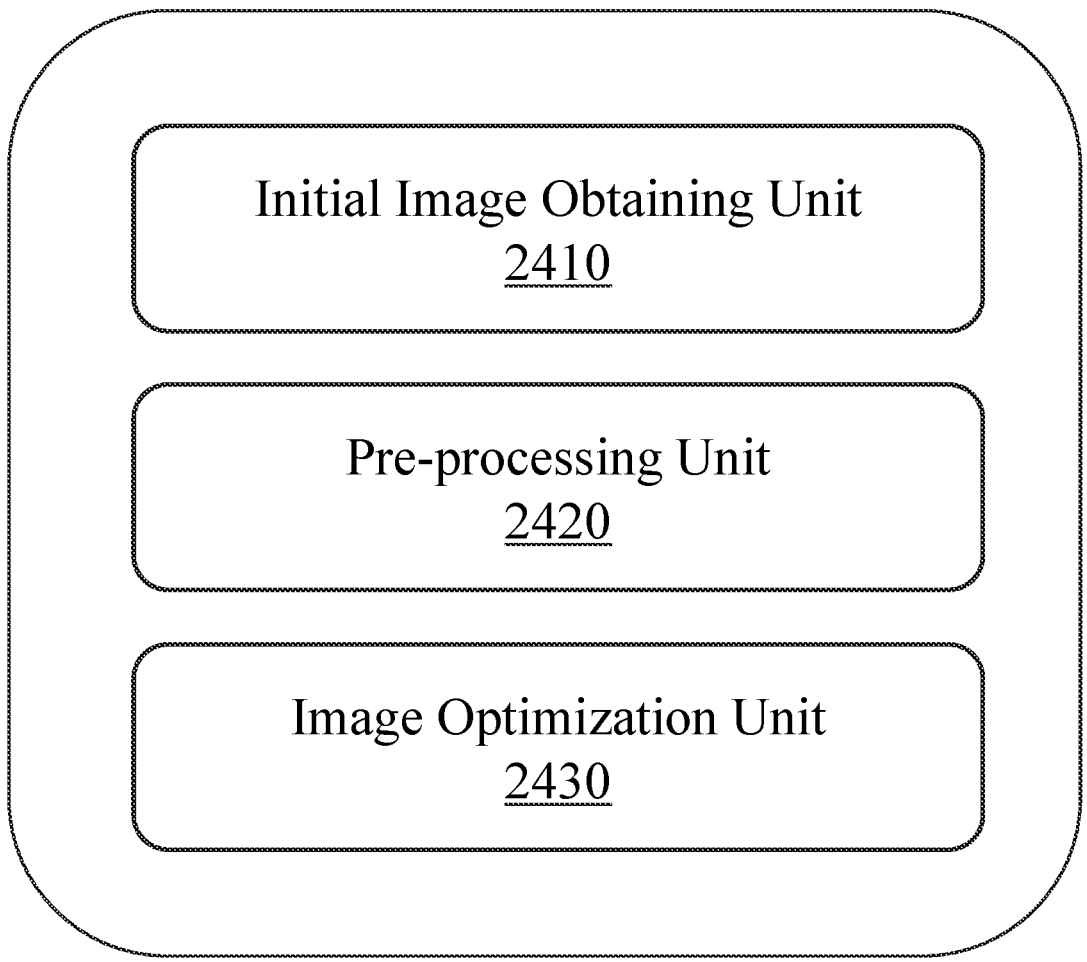
FIG. 24 illustrates an exemplary image obtaining module according to some other embodiments of the present disclosure.

FIG. 24 illustrates an exemplary image obtaining module according to some other embodiments of the present disclosure. In some embodiments, the image obtaining module 210 may further include an initial image obtaining unit 2410, a pre-processing unit 2420, and an image optimization unit 2430.

The initial image obtaining unit 2410 may be configured to obtain the initial image, which has the initial baseline location and the initial pulse repetition frequency.

More descriptions regarding the initial image may be found in step 1110 and its related descriptions, which will not be repeated herein.

The pre-processing unit 2420 may be configured to obtain the target image by pre-processing the initial image.

More descriptions regarding the target image may be found in step 1120 and its related descriptions, which will not be repeated herein.

The image optimization unit 2430 may be configured to determine a frequency curve diagram based on statistical information of the blood flow velocity in the target image, and obtain the ultrasound image by adjusting the initial baseline location and the initial pulse repetition frequency based on the frequency curve diagram, the blood flow signal center of the target image, and the image center of the target image.

More descriptions regarding the frequency curve diagram and the ultrasound image may be found in step 1120 and its related descriptions, which will not be repeated herein.

Figure 25:
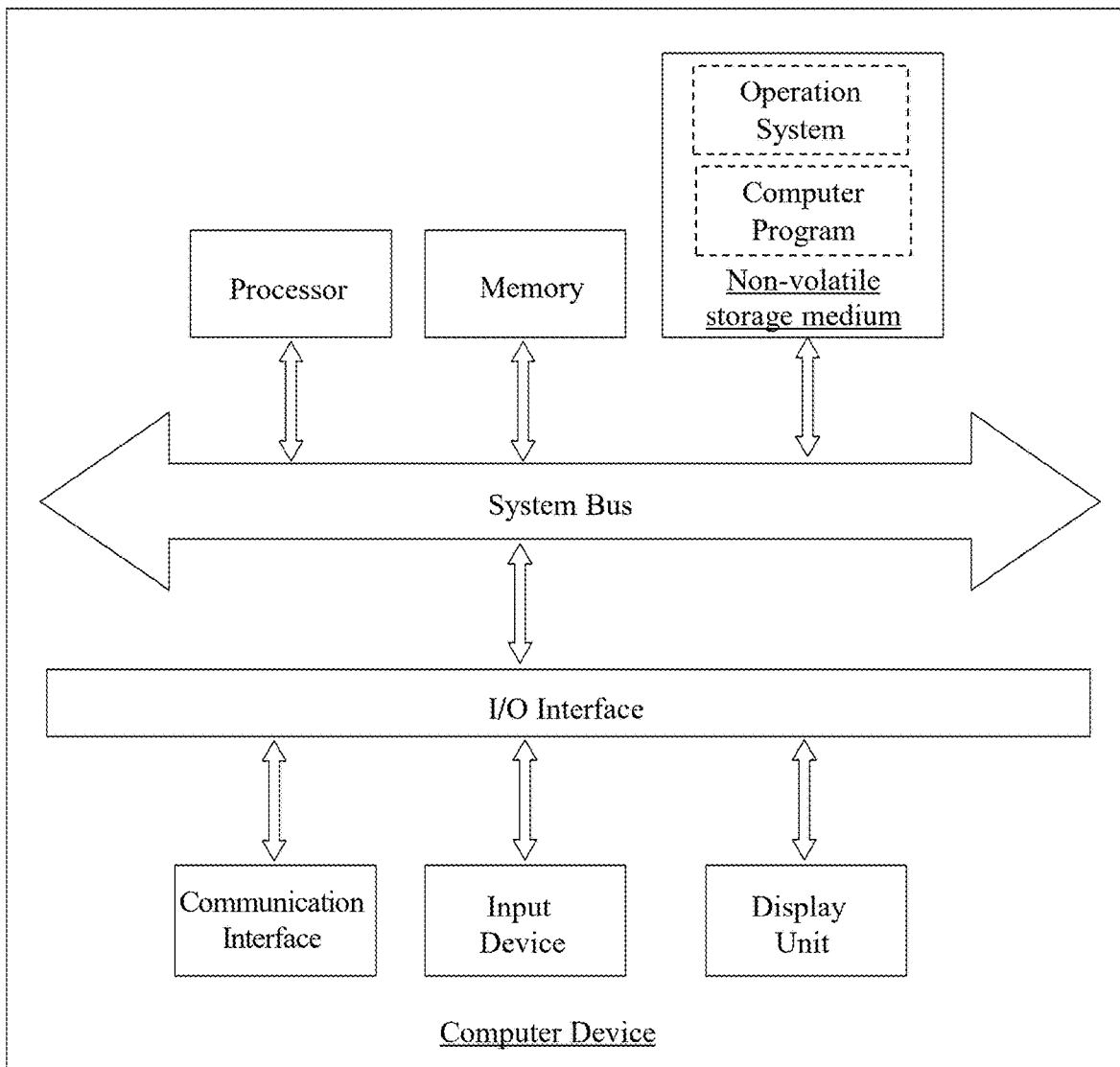
FIG. 25 is a schematic diagram illustrating an application environment of a method for ultrasound image processing according to some embodiments of the present disclosure.

The method provided in the embodiments of the present disclosure may be applied to an application environment as shown in FIG. 25. In one embodiment, a computer device is provided, which may be a terminal, an internal structure of which may be illustrated in FIG. 21. The computer device includes a processor connected through a system bus, a memory, a communication interface, a display, and an input device. The processor of the computer device may be configured to provide computing and control capabilities. The memory of the computer device includes a non-volatile storage medium, an internal memory. A non-volatile storage medium stores an operating system and a computer program. An internal memory provides an environment for operation of the operating system and the computer program in the non-volatile storage medium. A communication interface of the computer device may be configured to communicate with an external terminal by wired or wireless methods. The wireless method may be implemented by WIFI, a mobile cellular network, NFC (Near Field Communication) or other technologies. The computer program may be executed by the processor in order to implement a method for image processing. A display of the computer device may be a liquid crystal display or an e-ink display, and an input device of the computer device may be a touch layer covered by the display, or a button, a trackball or a touchpad set on a housing of the computer device, or an external keyboard, a touchpad or a mouse, etc.

It will be understood by those skilled in the art that the structure illustrated in FIG. 25, which is merely a block diagram of a portion of the structure associated with the present disclosure, does not constitute a limitation of the computer device to which the present disclosure scheme is applied. A specific computer device may include more or fewer components than shown in the figure, or combine some components, or have a different arrangement of components.

It should be understood that although the individual steps in the flowcharts involved in the embodiments as described above are shown sequentially as indicated by the arrows, the steps are not necessarily performed sequentially in an order indicated by the arrows. Except as expressly stated herein, there is no strict sequential limitation on execution of these steps, and the steps may be executed in other orders. Moreover, at least some of the steps in the flowcharts involved in the above embodiments may include multiple steps or multiple stages that are not necessarily performed at the same time, but may be performed at different times, and the order in which these steps or stages are performed is not necessarily sequential, but may be performed in sequence with other steps or at least a portion of steps or stages in other steps.

The embodiments of the present disclosure also provide an image processing device for implementing the above method for image processing based on a same inventive concept. An implementation solution of solving problems provided by the device is similar to the implementation solution documented in the above method, so the specific limitations in the one or more image processing device embodiments provided below may be found in the limitation for the method for image processing above, which will not be repeated herein.

It should be noted that the above descriptions of processes 300, 400, 1100 are merely provided for the purposes of example and illustration and does not limit the scope of application of the present disclosure. Various amendments and variations may be made to processes 300, 400, 1100 for those skilled in the art under the teachings of the present disclosure. However, these amendments and variations remain within the scope of the present disclosure. For example, step 330 and step 340 may be combined into one step, etc.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for ultrasound image processing, comprising:
   obtaining an ultrasound image, wherein the ultrasound image is associated with a blood flow velocity;
   determining, based on the ultrasound image, an envelope curve;
   determining a plurality of first maximum points of the envelope curve;
   obtaining, based on amplitude features of the plurality of first maximum points, a plurality of second maximum points by screening the plurality of first maximum points;
   obtaining a plurality of third maximum points by correcting the plurality of second maximum points according to time features of the plurality of second maximum points; and
   determining, based on the plurality of third maximum points, one or more parameters relating to the blood flow velocity.

2. The method of claim 1, wherein the determining a plurality of first maximum points of the envelope curve includes:
   obtaining, based on preset time intervals, one or more maximum points on the envelope curve as the plurality of first maximum points.

3. The method of claim 1, wherein the obtaining, based on amplitude features of the plurality of first maximum points, a plurality of second maximum points by screening the plurality of first maximum points includes:
   determining an amplitude threshold based on the amplitude features of the plurality of first maximum points; and
   obtaining the plurality of second maximum points by screening, based on the amplitude threshold, the plurality of first maximum points.

4. The method of claim 3, wherein the determining an amplitude threshold based on the amplitude features of the plurality of first maximum points includes:
   classifying the plurality of first maximum points to obtain a first group and a second group satisfying a classification condition, wherein the classification condition includes intra-group distribution conditions of the first group and the second group, and a difference condition between the first group and the second group; and
   determining the amplitude threshold based on numerical features of the first group and the second group.

5. The method of claim 3, wherein the determining an amplitude threshold based on the amplitude features of the plurality of first maximum points includes:
   sorting the plurality of first maximum points according to amplitudes;
   determining a point with a maximum slope change among the plurality of sorted first maximum points as an inflection point; and
   determining the amplitude threshold based on the inflection point.

6. The method of claim 5, wherein the determining the amplitude threshold based on the inflection point includes:
   determining a first average amplitude of a first portion of maximum points preceding the inflection point among the plurality of sorted first maximum points;
   determining a second average amplitude of a second portion of maximum points following the inflection point among the plurality of sorted first maximum points; and
   determining the amplitude threshold based on the first average amplitude and the second average amplitude.

7. The method of claim 1, wherein the obtaining a plurality of third maximum points by correcting the plurality of second maximum points according to time features of the plurality of second maximum points includes:
   obtaining a first time interval between each two adjacent second maximum points of the plurality of second maximum points and a first average time of the first time intervals;
   for the each two adjacent second maximum points,
      in response to determining that the first time interval is larger than a first time threshold, designating the two adjacent second maximum points and one or more maximum points between the two adjacent second maximum points as third maximum points;

in response to determining that the first time interval is smaller than a second time threshold, designating a second maximum point whose time is closest to the first average time in the two adjacent second maximum points as a third maximum point, and deleting another second maximum point in the two adjacent second maximum points, wherein the first time threshold is larger than the second time threshold; and in response to determining that the first time interval is smaller than or equal to the first time threshold and is larger than or equal to the second time threshold, designating the two adjacent second maximum points as the third maximum points.

8. The method of claim 1, wherein the determining, based on the ultrasound image, an envelope curve includes:
obtaining the envelope curve by processing the ultrasound image using an adaptive thresholding algorithm.

9. The method of claim 1, wherein the determining, based on the plurality of third maximum points, one or more parameters relating to the blood flow velocity includes:
determining a location of an end-diastole based on the plurality of third maximum points; and
determining at least one of a heart rate, a maximum peak flow rate, an end-diastole flow rate, a peak average velocity, a time-averaged flow rate, a resistance index, a beat index, a ratio of a systole peak flow rate to the end-diastole flow rate, or a velocity time integral based on the ultrasound image, the plurality of third maximum points, and/or the location of the end-diastole.

10. The method of claim 1, wherein the obtaining an ultrasound image includes:
obtaining an initial image, wherein the initial image has an initial baseline location and an initial pulse repetition frequency;
obtaining a target image by performing a pre-processing on the initial image;
determining a frequency curve diagram based on statistical information of the blood flow velocity in the target image; and
obtaining the ultrasound image by adjusting the initial baseline location and the initial pulse repetition frequency based on the frequency curve diagram, a blood flow signal center of the target image, and an image center of the target image.

11. The method of claim 10, wherein the pre-processing includes a binarization processing, and the binarization processing includes:
sorting pixel points in the initial image based on pixel values of the pixel points in the initial image to form a pixel value-pixel point count image;
forming a reference line by connecting a point at a first location and a point at a second location, wherein the point at the first location is a point with a smallest pixel value in the pixel value-pixel point count image, and the point at the second location is a point with a largest pixel value in the pixel value-pixel point count image;
determining a point farthest from the reference line on the pixel value-pixel point count image as a binarization threshold point; and
determining a binarization threshold based on the binarization threshold point, wherein the binarization threshold is used for the binarization processing.

12. The method of claim 11, wherein the binarization processing further includes:

in response to a determination that a pixel value of a pixel point in the initial image is smaller than the binarization threshold, determining the pixel value of the pixel point as a first value; and in response to a determination that the pixel value of the pixel point in the initial image is greater than or equal to the binarization threshold, determining the pixel value of the pixel point as a second value.

13. The method of claim 10, wherein the pre-processing includes:
obtaining the target image by performing a de-noising processing on one or more connected domains in the initial image.

14. The method of claim 13, wherein the obtaining the target image by performing a de-noising processing on one or more connected domains in the initial image includes:
obtaining the one or more connected domains in the initial image; and
in response to a determination that a count of pixel points in a connected domain among the one or more connected domains is smaller than a pixel point count threshold corresponding to the connected domain, obtaining the target image by updating pixel values of pixel points in the connected domain with the first value.

15. The method of claim 10, wherein the determining a frequency curve diagram based on statistical information of the blood flow velocity in the target image includes:
determining a count of rows of the target image based on an image size of the target image;
for each row of the target image, obtaining a frequency value of pixel points of the row by summing pixel values of the pixel points of the row; and
generating the frequency curve diagram based on the frequency value of the each row and the count of rows.

16. The method of claim 10, wherein the obtaining the ultrasound image by adjusting the initial baseline location and the initial pulse repetition frequency based on the frequency curve diagram, a blood flow signal center of the target image, and an image center of the target image includes:
in response to determining that there are no one or more line segments with a frequency value of zero in the frequency curve diagram, obtaining an optimized pulse repetition frequency by adjusting the initial pulse repetition frequency, such that there are one or more line segments with the frequency value of zero in the frequency curve diagram.

17. The method of claim 16, wherein the obtaining the ultrasound image by adjusting the initial baseline location and the initial pulse repetition frequency based on the frequency curve diagram, a blood flow signal center of the target image, and an image center of the target image further includes:
in response to determining that there one or more line segments with the frequency value of zero in the frequency curve diagram, obtaining the optimized pulse repetition frequency by adjusting the initial pulse repetition frequency based on the line segments with the frequency value of zero in the frequency curve diagram;
obtaining an optimized baseline location by adjusting the initial baseline location based on the frequency curve diagram, the blood flow signal center of the target image, and the image center of the target image; and obtaining the ultrasound image based on the optimized pulse repetition frequency and the optimized baseline location.

18. The method of claim 17, wherein the obtaining an optimized baseline location by adjusting the initial baseline location based on the frequency curve diagram, the blood flow signal center of the target image, and the image center of the target image includes:
determining a baseline displacement of the target image based on the blood flow signal center and the image center;
determining a flow direction of the blood flow signal in the target image based on the frequency curve diagram; and
adjusting the initial baseline location to the optimized baseline location based on the flow direction of the blood flow signal and the baseline displacement.

19. A system for ultrasound image processing, comprising:
at least one storage device storing executable instructions, and
at least one processor in communication with the at least one storage device, wherein when executing the executable instructions, the at least one processor causes the system to perform operations including:
obtaining an ultrasound image, wherein the ultrasound image is associated with a blood flow velocity;
determining, based on the ultrasound image, an envelope curve;
determining a plurality of first maximum points of the envelope curve;
obtaining, based on amplitude features of the plurality of first maximum points, a plurality of second maximum points by screening the plurality of first maximum points;
obtaining a plurality of third maximum points by correcting the plurality of second maximum points according to time features of the plurality of second maximum points; and
determining, based on the plurality of third maximum points, one or more parameters relating to the blood flow velocity.

20. A non-transitory computer readable medium, comprising at least one set of instructions for ultrasound image processing, wherein when executed by one or more processors of a computing device, the at least one set of instructions causes the computing device to perform a method, the method comprising:
obtaining an ultrasound image, wherein the ultrasound image is associated with a blood flow velocity;
determining, based on the ultrasound image, an envelope curve;
determining a plurality of first maximum points of the envelope curve;
obtaining, based on amplitude features of the plurality of first maximum points, a plurality of second maximum points by screening the plurality of first maximum points;
obtaining a plurality of third maximum points by correcting the plurality of second maximum points according to time features of the plurality of second maximum points; and
determining, based on the plurality of third maximum points, one or more parameters relating to the blood flow velocity.

* * * * *